US009855689B2

(12) United States Patent
Arakawa et al.

(10) Patent No.: US 9,855,689 B2
(45) Date of Patent: *Jan. 2, 2018

(54) SHAPED PRODUCT MADE OF FIBER-REINFORCED COMPOSITE MATERIAL AND HAVING EXCELLENT SURFACE APPEARANCE

(71) Applicant: Teijin Limited, Osaka-shi, Osaka (JP)

(72) Inventors: Motoomi Arakawa, Matsuyama (JP); Toru Sugiyama, Matsuyama (JP); Michiharu Taniguchi, Matsuyama (JP); Yasunori Nagakura, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 523 days.

This patent is subject to a terminal disclaimer.

(21) Appl. No.: 14/199,015

(22) Filed: Mar. 6, 2014

(65) Prior Publication Data
US 2014/0186584 A1 Jul. 3, 2014

Related U.S. Application Data

(63) Continuation of application No. PCT/JP2012/072498, filed on Sep. 4, 2012.

(30) Foreign Application Priority Data

Sep. 6, 2011 (JP) ................................. 2011-193977

(51) Int. Cl.
B29C 45/00 (2006.01)
B29C 43/14 (2006.01)
(Continued)

(52) U.S. Cl.
CPC .......... B29C 45/0005 (2013.01); B29C 43/14 (2013.01); B29C 70/12 (2013.01);
(Continued)

(58) Field of Classification Search
CPC .................................................. B29C 45/0005
See application file for complete search history.

(56) References Cited

U.S. PATENT DOCUMENTS 4,356,228 A * 10/1982 Kobayashi ............ B29C 70/025
156/285
5,705,254 A * 1/1998 Morinaga ............. B29C 33/424
219/121.68
(Continued)

FOREIGN PATENT DOCUMENTS

EP 0483716 A1 * 5/1992 ............ B29C 70/12
EP 2530124 A1 12/2012
(Continued)

OTHER PUBLICATIONS

Feb. 24, 2015—(EP) Office Action—App 12830027.4.
(Continued)

Primary Examiner — William P Watkins, III
(74) Attorney, Agent, or Firm — Banner & Witcoff, Ltd.

(57) ABSTRACT

There is provided a shaped product made of a fiber-reinforced composite material including reinforcing fibers having an average length of 5 mm or more and 100 mm or less and a thermoplastic resin, in which a volume fraction of reinforcing fibers (Vf=100×volume of reinforcing fibers/(volume of reinforcing fibers+volume of thermoplastic resin)) is 5 to 80%, grains are formed on a surface of the shaped product, and a ratio of a reinforcing fiber bundle (A) including the reinforcing fibers of a critical number of single fiber or more, the critical number defined by Formula (1), to the total amount of the reinforcing fibers is 20 Vol % or more and 99 Vol % or less:

Critical number of single fiber=600/D (1)

(wherein D is an average fiber diameter (μm) of single reinforcing fiber).

18 Claims, 4 Drawing Sheets

CONTENT OF GRAINS

TYPE: CONCAVE AND CONVEX PATTERN
CONVEX DENSITY: 50 convexes/20 mm
DEPTH: 30 μm
DRAFT ANGLE: 5 DEGREES

(51) Int. Cl.

| | | |
|---|---|---|
| *C08J 5/04* | (2006.01) | |
| *B29C 70/46* | (2006.01) | |
| *B29C 70/12* | (2006.01) | |
| *C08K 7/02* | (2006.01) | |
| *C08J 5/24* | (2006.01) | |
| *B29C 43/00* | (2006.01) | |
| *B29K 105/08* | (2006.01) | |
| *B29C 33/42* | (2006.01) | |
| *B29K 101/12* | (2006.01) | |
| *B29K 105/12* | (2006.01) | |

(52) U.S. Cl.
CPC ............ *B29C 70/46* (2013.01); *C08J 5/04* (2013.01); *C08J 5/042* (2013.01); *C08J 5/043* (2013.01); *C08J 5/24* (2013.01); *C08K 7/02* (2013.01); *B29C 33/424* (2013.01); *B29C 43/003* (2013.01); *B29K 2101/12* (2013.01); *B29K 2105/0854* (2013.01); *B29K 2105/0872* (2013.01); *B29K 2105/12* (2013.01); *C08J 2323/12* (2013.01); *C08J 2367/02* (2013.01); *C08J 2369/00* (2013.01); *C08J 2377/02* (2013.01); *C08J 2377/06* (2013.01); *Y10T 428/24405* (2015.01)

(56) References Cited

U.S. PATENT DOCUMENTS

| | | | |
|---|---|---|---|
| 7,754,323 B2 | 7/2010 | Murai et al. | |
| 8,946,342 B2* | 2/2015 | Konagai | B29C 70/12 264/115 |
| 2009/0004453 A1 | 1/2009 | Murai et al. | |
| 2009/0065965 A1* | 3/2009 | Bowen | B29B 7/42 264/148 |
| 2010/0028593 A1 | 2/2010 | Taketa et al. | |
| 2013/0317161 A1* | 11/2013 | Konagai | B29C 70/12 524/495 |
| 2013/0344282 A1 | 12/2013 | Yagi et al. | |
| 2014/0039114 A1 | 2/2014 | Hagihara et al. | |

FOREIGN PATENT DOCUMENTS

| | | |
|---|---|---|
| EP | 2669081 A1 | 12/2013 |
| EP | 2671991 A1 | 12/2013 |
| EP | 2796604 A1 | 10/2014 |
| EP | 2810979 A1 | 12/2014 |
| JP | S57-117661 A | 7/1982 |
| JP | H07-067694 | 6/1992 |
| JP | H05-131456 A | 5/1993 |
| JP | H05-132568 A | 5/1993 |
| JP | H06-246742 | 6/1994 |
| JP | H08-090571 A | 4/1996 |
| JP | H10-100174 A | 4/1998 |
| JP | H11-129268 | 5/1999 |
| JP | 2008-207545 A | 9/2008 |
| JP | 2011-178890 A | 9/2011 |
| JP | 2011-178891 A | 9/2011 |
| JP | 2012-172104 A | 9/2012 |
| JP | H05-086210 B2 | 11/2012 |
| WO | 2007-097436 A1 | 8/2007 |
| WO | 2012-105080 A1 | 8/2012 |
| WO | 2012-117593 A1 | 9/2012 |
| WO | 2012-140793 A1 | 10/2012 |

OTHER PUBLICATIONS

Feb. 10, 2015—(EP) Supplementary European Search Report—App 12830027.4.
Sep. 24, 2013—(PCT) IPER—App PCT/JP2012/072498—Eng Tran.
International Search Report received in corresponding International Application No. PCT/JP2012/072498 dated Dec. 11, 2012.
Aug. 17, 2015—(EP) Communication re: Third Party Observation—App 12830027.4.
Jespersen, S.T., Baudry, F., Wakeman, M.D., Michaud, V., Blanchard, P., Norris, R., and Manson, J-A.E., "Consolidation of Net-shape Random Fiber Thermoplastic Composite Preforms," Polymer Composites—2010, pp. 653-665.
Fujiwara, Yoshiaki and Hirasaki, Masato, NKK, "Processing and Application of Stampable Sheets," 1990 pp. 87-90.
Dec. 20, 2016—(JP) Notification of Reasons for Refusal—App 2013-532610—machine translation.
Aug. 30, 2016—(EP) Communication re: Third Party Observation—App 12830027.4.
Harper, Lee T., Turner, Thomas A., and Warrior, Nicholas A., "A Random Fibre Network Model for Predicting The Stochastic Effects of Discontinuous Fibre Composites," 16th International Conference on Composite Materials, pp. 1-10.
Sep. 6, 2016—(JP) Information Offer and accompanying documents—App 2013-532610—with Concise Statement (Eng).

* cited by examiner

CONTENT OF GRAINS

TYPE: CONCAVE AND CONVEX PATTERN
CONVEX DENSITY: 50 convexes/20 mm
DEPTH: 30 μm
DRAFT ANGLE: 5 DEGREES

CONTENT OF GRAINS

TYPE: CONCAVE AND CONVEX PATTERN
CONVEX DENSITY: 10 convexes/20 mm
DEPTH: 150 μm
DRAFT ANGLE: 10 DEGREES

CONTENT OF GRAINS

TYPE: LEATHER-LIKE WRINKLE
DEPTH: 225 μm
DRAFT ANGLE: 23 DEGREES

CONTENT OF GRAINS

TYPE: LEATHER-LIKE WRINKLE
DEPTH: 115 μm
DRAFT ANGLE: 11 DEGREES

SHAPED PRODUCT MADE OF FIBER-REINFORCED COMPOSITE MATERIAL AND HAVING EXCELLENT SURFACE APPEARANCE

CROSS-REFERENCE TO RELATED APPLICATIONS

This application is a continuation of PCT International Application No. PCT/JP2012/072498, filed on Sep. 4, 2012, which claims priority under 35 U.S.C. §119(a) to Japanese Patent Application No. 2011-193977 filed on Sep. 6, 2011, all of which are hereby expressly incorporated by reference into the present application.

TECHNICAL FIELD

The present invention relates to a shaped product which is made of a fiber-reinforced composite material including a reinforcing fiber and a thermoplastic resin and has an excellent surface appearance, and a method for producing the shaped product.

BACKGROUND ART

In recent years, there is an increasing need for lightening weight in various fields such as electrical and electronic equipments, automobiles, medical equipments, aircrafts, building materials, and general industrial parts, and housings or parts thereof need to be lightweight and to have high rigidity. As the housings or parts having a thin thickness and high rigidity, there have been used a shaped product in which a rolled plate of an aluminum alloy or a magnesium alloy is pressed, a shaped product obtained using a dicasting molding, a shaped product obtained by injection-molding a fiber-reinforced composite material filled with glass fibers or carbon fibers, or a shaped product obtained by integrally injection-molding a fiber-reinforced composite material plate with a thermoplastic resin.

The aluminum alloy or the magnesium alloy has excellent strength or rigidity, but since there is a limitation of shape formability, it is difficult to mold a complicate shape therewith only. Further, there is a problem in that a metal member (particularly, a magnesium alloy) has low corrosion resistance, and there is a problem in that a surface is corroded by moisture in the atmosphere or moisture or salts contained in sweat of a user to cause bad appearance of the member.

Patent Document 1 suggests a method for manufacturing a housing, including a coating step of coating the entire member made of a magnesium alloy with a resin layer, and a molding step of integrally molding the member and such a resin part. In this method, it is possible to form a complicate shape and give corrosion resistance, but a process is complicated. Further, although an aluminum alloy or a magnesium alloy, and a resin have specific strength higher than iron, but specific strength thereof is lower than a fiber-reinforced composite material to be described below. Therefore, there is a limitation in achieving lightening weight.

Since the fiber-reinforced composite material has specific strength, excellent specific rigidity, and excellent corrosion resistance, the fiber-reinforced composite material has been used in a wide field for the purpose described above. In particular, the shaped product made of the fiber-reinforced composite material filled with the glass fibers or the carbon fibers has been widely used due to high flexibility in shape and high productivity. However, since a length of the fiber included in a shaped article is shortish, the shaped product has still a problem in use requiring high strength or rigidity.

Meanwhile, due to excellent specific strength and specific rigidity, the fiber-reinforced composite material reinforced by using a continuous fiber has been primarily used in use requiring high strength or rigidity. However, since the aforementioned fiber-reinforced composite material is low flexibility in shape in comparison to a resin, or a fiber-reinforced composite material through injection-molding, it is difficult to mold a complicate shape with a simple substance. Furthermore, there is a problem in that since the fiber-reinforced composite material is manufactured by layering the reinforcing fibers in a woven fabric form in multiple layers, productivity is low. Patent Document 2 suggests a composite shaped product obtained by joining a resin member to an outer edge of a plate-shaped member made from a sheet including a reinforcing fiber, particularly, a continuous fiber. Accordingly, it is possible to implement a shaped product having a complicate shape. However, since the shaped product is manufactured through multiple processes, productivity may be not high. In addition, the fiber-reinforced composite material using the continuous fiber is typically obtained by heating and pressurizing, for two hours or more, a material, which is called a prepreg obtained by previously impregnating a thermosetting resin into a reinforcing fiber base material.

There has been recently suggested a RTM molding method in which after a reinforcing fiber base material into which a resin is not impregnated is set in a mold, a thermosetting resin is allowed to flow in the mold, and in this method, a molding time is remarkably reduced. However, even in the RTM molding method, since it takes a time of 10 minutes or more to mold one part, productivity is not improved.

For this reason, there has been noticed a fiber-reinforced composite material manufactured using a thermoplastic resin as a matrix instead of the conventional thermosetting resin (for example, Patent Document 3). However, the fiber-reinforced composite material manufactured using the thermoplastic resin as a matrix is now being studied and developed, and a technology for obtaining a shaped product having an excellent surface appearance and a quality endurable to practical use by molding the fiber-reinforced composite material has not been sufficiently established.

CITATION LIST

Patent Literature

Patent Document 1: Japanese Patent Application Laid-Open No. 2010-147376
Patent Document 2: Japanese Patent Application Laid-Open No. 2010-14180
Patent Document 3: International Publication No. 2007/097436

SUMMARY OF INVENTION

Technical Problem

An object of the present invention is to provide a shaped product which is made of a fiber-reinforced composite material including reinforcing fibers and a thermoplastic resin and has an excellent surface appearance, and a method for manufacturing the shaped product.

Solution to Problem

In view of the foregoing problem, the present inventors found that in a shaped product made of a fiber-reinforced composite material including: a random reinforcing fiber having a resin fiber bundle satisfying a specific fiber-opening condition; and a thermoplastic resin, fine processing is performed on a surface of the shaped product during a molding process, and the shaped product has excellent strength.

That is, the present invention relates to a shaped product made of a fiber-reinforced composite material including reinforcing fibers having an average length of 5 mm or more and 100 mm or less and a thermoplastic resin, in which a volume fraction of reinforcing fibers (Vf=100× volume of reinforcing fibers/(volume of reinforcing fibers+volume of thermoplastic resin)) is 5 to 80%, grains are formed on a surface of the shaped product, and a ratio of a reinforcing fiber bundle (A) including the reinforcing fibers of a critical number of single fiber or more, the critical number being defined by Formula (1), to the total amount of the reinforcing fibers is 20 Vol % or more and 99 Vol % or less, Critical number of single fiber=600/D (1)

(wherein D is an average fiber diameter (μm) of single reinforcing fiber).

Further, the present invention relates to a method for manufacturing the shaped product by using a random mat including reinforcing fibers having an average fiber length of 5 mm or more and 100 mm or less and a thermoplastic resin, wherein a fiber areal weight of the reinforcing fibers is 25 to 10000 g/m$^2$, and a ratio of a reinforcing fiber bundle (A) including the reinforcing fibers of a critical number of single fiber or more, the critical number being defined by Formula (1), to the total amount of the reinforcing fibers in the random mat is 20 Vol % or more and 99 Vol % or less, Critical number of single fiber=600/D (1)

(wherein D is an average fiber diameter (μm) of single reinforcing fiber).

The method includes the following steps A-1) to A-3) for performing an impregnation process and a molding process:

A-1) a step of obtaining a prepreg by heating the random mat to a temperature in a range of the melting point to the decomposition temperature when the thermoplastic resin is crystalline and to the glass transition temperature to the decomposition temperature when the thermoplastic resin is amorphous, pressurizing the random mat, and impregnating the thermoplastic resin into the reinforcing fiber bundle;

A-2) a step of arranging the prepreg obtained in the step A-1) in a graining mold whose temperature is adjusted to a temperature lower than the melting point when the thermoplastic resin is crystalline or to a temperature lower than the glass transition temperature when the thermoplastic resin is amorphous so that a charge rate expressed by Formula (3) is in a range of 5% or more, after the prepreg obtained in step A-1) is heated to a temperature equal to or higher than the melting point and lower than the decomposition temperature when the thermoplastic resin is crystalline or to a temperature equal to or higher than the glass transition temperature or lower than the decomposition temperature when the thermoplastic resin is amorphous:

Charge rate (%)=100×base material area (mm$^2$)/projected area (mm$^2$) of cavity of mold (3)

(wherein the base material area refers to a projected area of all the arranged random mat or prepreg in an draft direction, and the projected area of the cavity of the mold refers to a projected area in the draft direction); and A-3) a step of pressurizing and molding the prepreg arranged in the graining mold in the step A-2).

Alternatively, the method includes the following steps B-1) to B-4) for performing an impregnation process and a molding process:

B-1) a step of arranging the random mat in a graining mold so that a charge rate expressed by Formula (3) is in a range of 5% or more, Charge rate (%)=100×base material area (mm$^2$)/projected area (mm$^2$) of cavity of mold (3)

(wherein the base material area refers to a projected area of all the arranged random mat or prepreg in an draft direction, and the projected area of the cavity of the mold refers to a projected area in the draft direction);

B-2) a step of heating the graining mold to a temperature in a range of the melting point to the decomposition temperature of the thermoplastic resin when the thermoplastic resin is crystalline or to a temperature in a range of the glass transition temperature to the decomposition temperature of the thermoplastic resin when the thermoplastic resin is amorphous, and pressuring the random mat to perform impregnation (first press step);

B-3) a step of pressurizing the random mat in at least one pressure step so as to allow a pressure of a final pressure step to be 1.2 to 100 times greater than the pressure of the first press step (second press step); and B-4) a step of molding the random mat by adjusting a temperature of the mold to be lower than the melting point when the thermoplastic resin is crystalline and to be lower than the glass transition temperature when the thermoplastic resin is amorphous.

Effects of Invention

According to the present invention, by using a shaped product which is made of a fiber-reinforced composite material including reinforcing fibers and a thermoplastic resin and has an excellent surface appearance such a shaped product may be achieve requirements of lightening weight and surface appearance in various fields such as electrical and electronic equipments, automobiles, medical equipments, aircrafts, building materials, and general industrial parts.

DESCRIPTION OF EMBODIMENTS

Figure 1:
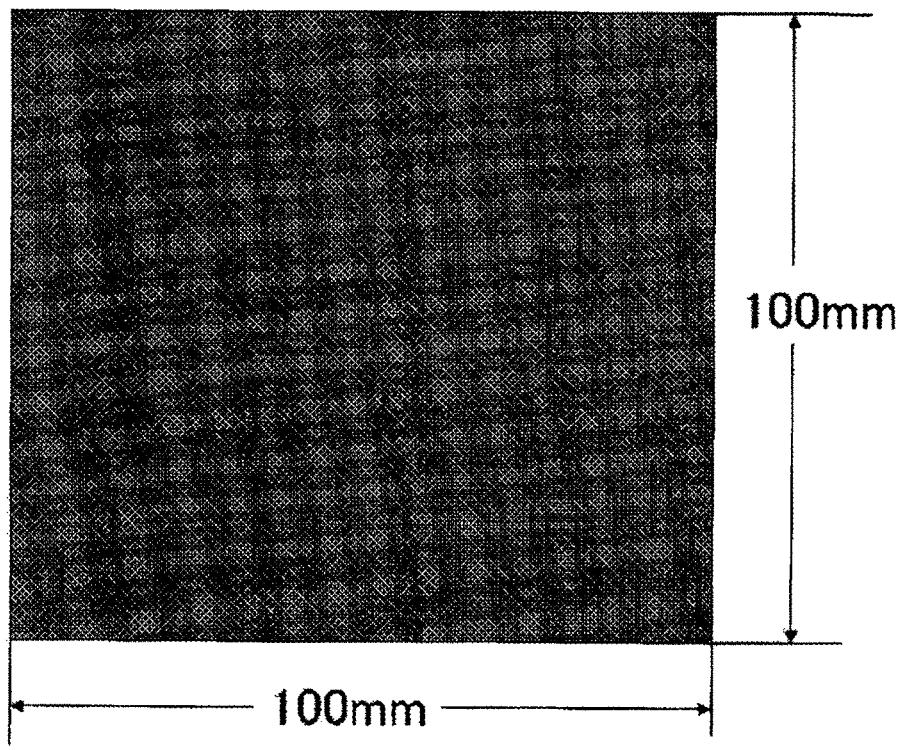
FIG. 1 is a schematic diagram of a surface including grains having a concave and convex pattern, a convex density of 50 convexes/20 mm, a depth of 30 μm, and a draft angle of 5 degrees in shaped products obtained through Examples 1, 2, 6 to 10, and Comparative Example 3, and a graining mold including a cavity having a surface to which the grain shape is transferred is used in Examples 1, 2 and 6 to 10 and Comparative Examples 1 to 3.

Hereinafter, embodiments of the present invention will be described in sequence, but the present invention is not limited thereto.

<Shaped Product>

There is provided a shaped product made of a fiber-reinforced composite material including reinforcing fibers having an average length of 5 mm or more and 100 mm or less and a thermoplastic resin. In the shaped product, a volume fraction of reinforcing fibers (Vf=100×volume of reinforcing fibers/(volume of reinforcing fibers+volume of thermoplastic resin)) is 5 to 80%, grains are formed on a surface of the shaped product, and a ratio of a reinforcing fiber bundle (A) including the reinforcing fibers of a critical number of single fiber or more, the critical number being defined by Formula (1), to the total amount of the reinforcing fibers is 20 Vol % or more and 99 Vol % or less, $$\text{Critical number of single fiber}=600/D \tag{1}$$

(wherein D is an average fiber diameter (μm) of single reinforcing fiber).

The shaped product of the present invention has grains on the surface. The grains in the present invention refer to patterns formed on the surface of the shaped product. Examples of the patterns include concave and convex patterns and wrinkles. The patterns may be regular patterns or irregular patterns, but may be preferably regular concave and convex patterns or regular wrinkles. Leather-like concave and convex patterns or leather-like wrinkles are especially preferable in consideration of a high-grade impression. A depth of one pattern is 1 to 1000 μm, and preferably 5 to 500 μm. More preferably, the depth of one pattern is 10 to 300 μm. When the depth of one pattern is less than 1 μm, since the pattern is not easily perceived, a surface appearance is deteriorated. When the depth of one pattern is more than 1000 μm, since the pattern is not recognized as a design, the surface appearance may be deteriorated. A draft angle of one pattern is 0.1 to 50 degrees, and preferably, 0.5 to 30 degrees. More preferably, the draft angle of one pattern is 1 to 20 degrees. When the draft angle is too small, it is difficult to separate the shaped product from the mold at the time of molding. When the draft angle is too large, since the pattern is not easily recognized as a design, the surface appearance may be deteriorated. Preferably, a size of one pattern is 1 to 1000 μm, and more preferably 5 to 500 μm. When such patterns are regularly arranged, preferably, the number of patterns is 10 to 1000 per 10 mm, and more preferably, 10 to 100. When an aspect ratio of a long-axis direction to a short-axis direction is large in the pattern as in the wrinkle, a length in the long-axis direction is 1 to 1000 mm, and preferably 5 to 500 mm. More preferably, the length in the long-axis direction is 10 to 100 mm. A length in the short-axis direction is 1 to 1000 μm, and preferably 50 to 500 μm. More preferably, the length in the short-axis direction is 10 to 300 μm.

By forming such grains on the surface of the shaped product, it is possible to give the good surface appearance and the high-grade impression to the shaped product. The shaped product on which the grains are formed are preferably used in housings or parts for electrical and electronic equipments such as a television, a video cassette recorder, a personal computer, a camera and a digital camera, and interior parts for automobiles such as an instrument panel and a door trim.

The reinforcing fibers constituting the shaped product of the present invention are discontinuous and have an average fiber length of 5 mm or more and 100 mm or less. Accordingly, it is possible to obtain a shaped product having a high physical property even for an impact load or a long-term fatigue load in addition to static strength and rigidity. When the shaped product has an average fiber length of less than 5 mm, a physical property of the shaped product may be degraded, whereas when the shaped product has an average fiber length of more than 100 mm, the handleability of the reinforcing fibers may be lowered. The average fiber length of the reinforcing fibers is preferably 10 mm or more, more preferably 15 mm or more, and still more preferably 20 mm or more. Further, the fiber length of the reinforcing fibers is preferably 80 mm or less, and more preferably 60 mm or less. The average fiber length of 5 mm to 80 mm is especially preferable.

Examples of the reinforcing fibers included in the fiber-reinforced composite material constituting the shaped product of the present invention are not particularly limited, and may include at least one selected from a group consisting of inorganic fibers such as carbon fibers, glass fibers, stainless steel fibers, alumina fibers and mineral fibers, and organic fibers such as polyether ether ketone fibers, polyphenylene sulfide fibers, polyethersulfone fibers, aramid fibers, polybenzoxazole fibers, polyarylate fibers, polyketone fibers, polyester fibers, polyamide fibers, and polyvinyl alcohol fibers. Among them, the reinforcing fibers may be preferably at least one selected from a group consisting of carbon fibers, aramid fibers, and glass fibers for a purpose requiring strength or rigidity. For a purpose requiring electrical conductivity, the carbon fibers are preferable, and carbon fibers coated with metal such as nickel are more preferable. For a purpose requiring electromagnetic wave transmittance, the glass fibers or organic fibers are preferable, and the aramid fibers and the glass fibers are more preferable in consideration of a balance between the electromagnetic wave transmittance and the strength. For a purpose requiring impact strength, the organic fibers are preferable, and the polyamide fibers and the polyester fibers are more preferable in consideration of cost. In particular, the carbon fibers are preferable since a lightweight composite material having excellent strength can be provided.

The average fiber diameter of the reinforcing fibers included in the fiber-reinforced composite material constituting the shaped product of the present invention is not particularly limited, and for example, in a case of carbon fibers, the average fiber diameter is preferably 3 to 12 μm, and more preferably 5 to 7 μm. In a case of polyester fibers, the average fiber diameter is preferably 10 to 50 μm, and more preferably, 15 to 35 μm. The reinforcing fibers may be used in combination with each other, and the kind of the reinforcing fibers may be appropriately used depending on parts of the shaped product. It may be possible to manufacture the shaped product while the fiber-reinforced composite material using different reinforcing fibers is entirely or partially layered.

Examples of the thermoplastic resin included in the fiber-reinforced composite material constituting the shaped product of the present invention may include at least one selected from a group consisting of a vinyl chloride resin, a vinylidene chloride resin, a vinyl acetate resin, a polyvinyl alcohol resin, a polystyrene resin, an acrylonitrile-styrene resin (AS resin), an acrylonitrile-butadiene-styrene resin (ABS resin), an acryl resin, a methacryl resin, a polyethylene resin, a polypropylene resin, a polyamide 6 resin, a polyamide 11 resin, a polyamide 12 resin, a polyamide 46 resin, a polyamide 66 resin, a polyamide 610 resin, a polyacetal resin, a polycarbonate resin, a polyethylene terephthalate resin, a polyethylene naphthalate resin, a polybutylene terephthalate resin, a polyarylate resin, a polyphenylene ether rein, a polyphenylene sulfide resin, a polysulfone resin, a polyethersulfone resin, a polyether ether ketone resin, and a polylactic acid resin. Among them, the thermoplastic resin may be more preferably at least one selected from a group consisting of polyolefin, polyamide, polycarbonate, and polyester in consideration of an effect of improving a physical property and convenience of use. The polyamide may be preferably at least one selected from a group consisting of a polyamide 6 resin, a polyamide 11 resin, a polyamide 12 resin, a polyamide 46 resin, a polyamide 66 resin, and a polyamide 610 resin. The polyester may be preferably at least one selected from a group consisting of a polyethylene terephthalate resin, a polyethylene naphthalate resin, and a polybutylene terephthalate resin.

In the shaped product of the present invention, a volume fraction of reinforcing fibers (Vf), which is defined by the following formula (4), to the fiber-reinforced composite material constituting the shaped product is 5 to 80%.

$$\text{Volume fraction of reinforcing fibers (Vf)}=100\times\text{volume of reinforcing fibers/(volume of reinforcing fibers+volume of thermoplastic resin)} \quad (4)$$

The volume fraction of reinforcing fibers (Vf) refers to a composition of the reinforcing fibers and the thermoplastic resin included in the shaped product made of the fiber-reinforced composite material. When the volume fraction of reinforcing fibers is less than 5%, a reinforcing effect may not be exhibited sufficiently. Furthermore, when the volume fraction of reinforcing fibers is higher than 80%, a void is easily caused in the fiber-reinforced composite material, and thereby a physical property of the shaped product may be deteriorated. The volume fraction of reinforcing fibers is more preferably 20 to 60%.

As a specific method of calculating the volume fraction of reinforcing fibers (Vf), the method includes measuring weights of the thermoplastic resin and the reinforcing fibers by removing a thermoplastic resin from a sample of a shaped product, changing values of the weights into volumes by using a density of each component, and then applying values of the volumes to the above formula.

As a method of removing the thermoplastic resin from the sample of the shaped product, when the reinforcing fibers are inorganic fibers such as carbon fibers or glass fibers, a burning and removing (pyrolysis) method may be used preferably and simply. In this case, after measuring a weight of the well-dried sample of the shaped product, components of the thermoplastic resin are burned by treating the sample at 500 to 700° C. for 5 to 60 minutes by using an electric furnace. The reinforcing fibers remaining after burning may be cooled at a dry atmosphere, and then a weight of each component may be calculated by measuring the weight.

As the method for removing the thermoplastic resin from the sample of the shaped product, a method that decomposes or dissolves the thermoplastic resin by using chemical substances that is easy to decompose the thermoplastic resin or dissolve the thermoplastic resin is preferably used. Specifically, a weight of the sample of the thin shaped product having an area of 1 $cm^2$ to 10 $cm^2$ may be measured, and dissolved components may be extracted by using chemical substances that dissolve or decompose the thermoplastic resin. Thereafter, residues are cleaned and dried, and the weight of each component may be measured and calculated. For example, when the thermoplastic resin is polypropylene, it is possible to dissolve the polypropylene by using heated toluene or xylene. When the thermoplastic resin is polyamide, it is possible to dissolve the polyamide by using heated formic acid. When the thermoplastic resin is polycarbonate, it is possible to dissolve the polycarbonate by using heated chlorinated hydrocarbon.

When a content of the reinforcing fibers and the thermoplastic resin included in the fiber-reinforced composite material constituting the shaped product of the present invention are expressed in weights, the thermoplastic resin is in a range of preferably 50 to 1000 parts by weight, more preferably 50 to 500 parts by weight, and still more preferably 60 to 300 parts by weight based on 100 parts by weight of the reinforcing fibers. When a ratio of the thermoplastic resin to 100 parts by weight of the reinforcing fibers is less than 50 parts by weight, a void is easily caused in the fiber-reinforced composite material, and thereby strength or rigidity may be deteriorated. On the contrary, when the ratio of the thermoplastic resin is more than 1000 parts by weight, the reinforcing effect of the reinforcing fibers may not be easily exhibited.

In the shaped product of the present invention, it is possible to consider a surface other than a portion at which grains are formed by using a graining mold as being smooth. Herein, the surface being smooth means that when the surface of the shaped product is visually inspected, rough shaped patterns, wrinkles, and concave and convex patterns, which are not intended, are not recognized and the surface is flat and polish.

Moreover, the shaped product of the present invention may have a uniform thickness. The uniform thickness mentioned herein means that on the surface having the grains, for example, in concave and convex-shaped grains, there are no variations in a height of a top of a convex part or a depth of a bottom of a concave part, which should have the same depth. In addition, regarding the uniform thickness of a portion of the surface of the shaped product at which the grains are not formed, when the thickness of the shaped product is measured at multiple portions and an arithmetic mean (hereinafter, an "average value" means an arithmetic means value unless otherwise specifically stated) is calculated, a variation in thickness is expressed within ±10% from the average value. That is, a variation (%) of a thickness of each measurement point, which is represented by Formula (5) is −10 or more and +10 or less.

$$\text{Variation (\%) of thickness}=100\times(\text{measurement values of thicknesses}-\text{average value of thicknesses})/\text{average value of thicknesses} \quad (5)$$

Moreover, when the uniform thickness of the shaped product is expressed as another expression, a standard deviation calculated from the thickness of each portion of the shaped product at which the grains are not formed, and the average value of the thicknesses is preferably 0 to 0.1, more preferably 0 to 0.08, still more preferably 0 to 0.07, and most preferably 0 to 0.01. Since the thickness be completely uniform at the respective portions of the shaped product, a value of the standard deviation is particularly preferably 0.

The number of points of measuring the thickness of the shaped product when it is checked whether or not the thickness of the shaped product is uniform is preferably large. However, in consideration of accuracy and an effort to measure, the number of portions of measuring the thicknesses is preferably 5 or more and 100 or less, and more preferably, 10 or more and 50 or less. As the portions for measuring the thickness of the shaped product, it is preferable to uniformly measure portions of the shaped product where the grains are not formed.

In the shaped product of the present invention, a ratio of a reinforcing fiber bundle (A) including the reinforcing fibers of a critical number of single fiber or more, the critical number being defined by Formula (1), to the total amount of the reinforcing fibers is 20 Vol % or more and 99 Vol % or less, $$\text{Critical number of single fiber} = 600/D \tag{1}$$

(wherein D is an average fiber diameter (μm) of single reinforcing fiber).

When a ratio of the reinforcing fiber bundle (A) to the total amount of the reinforcing fibers is less than 20 Vol %, it is possible to obtain a shaped product having an excellent surface quality, but it is difficult to obtain a shaped product having an excellent mechanical property. When a ratio of the reinforcing fiber bundle (A) to the total amount of the reinforcing fibers is more than 99 Vol %, since entangled portions of the reinforcing fiber becomes locally thick, it is difficult to obtain a thin-walled shaped product. A ratio of the reinforcing fiber bundle (A) is preferably 30 Vol % or more to less than 90 Vol %, and more preferably 30 Vol % or more to less than 80 Vol %.

When the reinforcing fiber bundle (A) is expressed as another expression, in the fiber-reinforced composite material constituting the shaped product of the present invention, the reinforcing fibers of 20 Vol % or more and 99 Vol % or less are the reinforcing fiber bundle (A) including the reinforcing fibers of the critical number of single fiber or more, the critical number being defined by Formula (1), the other reinforcing fibers of 1 Vol % or more and 80 Vol % or less are single fibers or a fiber bundle including fibers lower than the critical number of single fiber, and such reinforcing fibers are dispersed in the thermoplastic resin.

Further, in the fiber-reinforced composite material constituting the shaped product of the present invention, in a case where an average number of fibers (N) of the reinforcing fiber bundle (A) including the reinforcing fibers of the critical number of single fiber or more preferably satisfies Formula (2), it is preferred that a thin-walled shaped product having a thickness of about 0.2 to 1 mm has a smooth surface and a uniform thickness, $$0.7 \times 10^4/D^2 < N < 1 \times 10^5/D^2 \tag{2}$$

(wherein D is an average fiber diameter (μm) of single reinforcing fiber).

Specifically, when the reinforce fibers are carbon fibers and an average fiber diameter of the carbon fibers included in the random mat is 5 to 7 μm, the critical number of single fiber is in a range of 86 to 120. When an average fiber diameter of the carbon fibers is 5 μm, an average number of fibers in the fiber bundle is in a range of more than 280 to less than 4000, preferably 600 to 2500, and more preferably 600 to 1600. When an average fiber diameter of the carbon fibers is 7 μm, an average number of fibers in the fiber bundle is in a range of more than 142 to less than 2040, preferably 300 to 1600, and more preferably 300 to 800.

When an average number of fibers (N) in the reinforcing fiber bundle (A) is equal to or less than $0.7 \times 10^4/D^2$, it may be difficult to obtain a high volume fraction of reinforcing fibers (Vf). Further, when an average number of fibers (N) in the reinforcing fiber bundle (A) is equal to or more than $1 \times 10^5/D^2$, a thick portion may be locally formed, which may cause a void. More preferably, the average number of fibers (N) of the reinforcing fiber bundle (A) satisfies Formula (2'), $$0.7 \times 10^4/D^2 < N < 6 \times 10^4/D^2 \tag{2'}$$

(wherein D is an average fiber diameter (μm) of single reinforcing fiber).

In the shaped product of the present invention, a ratio of tensile modulus (hereinafter, also abbreviated to Eδ) obtained by dividing a higher value by a lower value between tensile modulus values measured in an arbitrary direction and a direction perpendicular thereto (hereinafter, also referred to as a 0-degree direction and 90-degree direction) is preferably 1.0 to 1.3. The Eδ is an indicator of an isotropic property of a material, and the material is regarded as having an isotropic property when the Eδ is less than 2, whereas the material is regarded as having a particularly excellent isotropic property when the Eδ is equal to or less than 1.3.

The fiber-reinforced composite material constituting the shaped product of the present invention may include functional fillers and additives, in addition to the reinforcing fibers and the thermoplastic resin as long as the object of the present invention is not detracted. The fillers and additives may include organic/inorganic fillers, flame-retardant agents, anti-UV agents, pigments, release agents, softeners, plasticizers, and surfactants, but are not limited thereto. In particular, when used for electrical and electronic equipments or automobiles, the random mat requires a high flame-retardancy. Accordingly, a flame-retardant agent is preferably contained in the thermoplastic resin. The flame-retardant agent may be employed from known agents in the art and is not particularly limited as long as it can impart a thermoplastic composite with a flame-retardancy. Specifically, examples of the flame-retardant agent may include phosphorus-based flame-retardant agents, nitrogen-based flame-retardant agents, silicone compounds, organic alkaline metal salts, organic alkaline earth metal salts, and bromine-based flame-retardant agents. These flame-retardant agents may be used alone or in combination. An amount of the flame-retardant agent may be in a range of preferably 1 to 40 parts by weight and more preferably 1 to 20 parts by weight based on 100 parts by weight of the resin in consideration of a balance among a physical property, moldability, and flame-retardancy.

<Method for Manufacturing Shaped Product>

The present invention relates to a method for manufacturing the shaped product by using a random mat in which reinforcing fibers having an average fiber length of 5 mm or more and 100 mm or less and a thermoplastic resin are included, a fiber areal weight of the reinforcing fibers is 25 to 10000 g/m², and more preferably 25 to 3000 g/m², and a ratio of a reinforcing fiber bundle (A) including the reinforcing fibers of a critical number of single fiber or more, the critical number defined by Formula (1), to the total amount of the reinforcing fibers in the random mat is 20 Vol % or more and 99 Vol % or less, $$\text{Critical number of single fiber} = 600/D \tag{1}$$

(wherein D is an average fiber diameter (μm) of single reinforcing fiber).

The shaped product of the present invention is obtained by performing an impregnation process and a molding process onto the above-described random mat through the following steps A-1) to A-3):

A-1) a step of obtaining a prepreg by heating the random mat to a temperature in a range of the melting point to the decomposition temperature when the thermoplastic resin is crystalline or to a temperature in a range of the glass transition temperature to the decomposition temperature when the thermoplastic resin is amorphous, pressurizing the random mat, and impregnating the thermoplastic resin into the reinforcing fiber bundle;

A-2) a step of arranging the prepreg obtained in the step A-1) in a graining mold whose temperature is adjusted to a temperature lower than the melting point when the thermoplastic resin is crystalline or to a temperature lower than the glass transition temperature when the thermoplastic resin is amorphous so that a charge rate expressed by Formula (3) is in a range of 5% or more, after the prepreg obtained in step A-1) is heated to a temperature equal to or higher than the melting point and lower than the decomposition temperature when the thermoplastic resin is crystalline or to a temperature equal to or higher than the glass transition temperature and lower than the decomposition temperature when the thermoplastic resin is amorphous:

$$\text{Charge rate (\%)}=100 \times \text{base material area(mm}^2)/\text{projected area(mm}^2) \text{ of cavity of mold} \quad (3)$$

(wherein the base material area refers to a projected area of all the arranged random mat or prepreg in an draft direction, and the projected area of the cavity of the mold refers to a projected area in the draft direction); and A-3) a step of pressurizing and molding the prepreg arranged in the graining mold in the step A-2).

Alternatively, the method includes the following steps B-1) to B-4) for performing an impregnation process and a molding process:

B-1) a step of arranging the random mat in a graining mold so that a charge rate expressed by Formula (3) is in a range of 5% or more, $$\text{Charge rate (\%)}=100 \times \text{base material area (mm}^2)/\text{projected area (mm}^2) \text{ of cavity of mold} \quad (3)$$

(wherein the base material area refers to a projected area of all the arranged random mat or prepreg in an draft direction, and the projected area of the cavity of the mold refers to a projected area in the draft direction);

B-2) a step of heating the graining mold to a temperature in a range of the melting point to the decomposition temperature of the thermoplastic resin when the thermoplastic resin is crystalline or to a temperature in a range of the glass transition temperature to the decomposition temperature of the thermoplastic resin when the thermoplastic resin is amorphous, and pressuring the random mat to perform impregnation (first press step);

B-3) a step of pressurizing the random mat in at least one pressure step so as to allow a pressure of a final pressure step to be 1.2 to 100 times greater than the pressure of the first press step (second press step); and B-4) a step of molding the random mat by adjusting a temperature of the mold to be lower than the melting point when the thermoplastic resin is crystalline and to be lower than the glass transition temperature when the thermoplastic resin is amorphous.

The method of performing an impregnation process and a molding process through the steps A-1) to A-3) is a so-called cold press method. The method of performing an impregnation process and a molding process through the steps B-1) to B-4) is a so-called hot press method. Although both of the press molding methods can be applied to the shaped product of the present invention, the cold press method is more preferably used in consideration that a molding time can be further reduced.

The above-described steps may be continuously carried out after a process of manufacturing a random mat or may be separately carried out after a random mat is firstly manufactured.

Furthermore, in the present invention, the base material (the random mat or the prepreg) is allowed to flow by arranging the base material so as to have a low charge rate with respect to a shape of a graining mold and pressurizing the base material. By doing this, the base material is easily filled in a complicated shape. In general, when the fiber-reinforced composite material is allowed to flow, the reinforcing fibers tend to be aligned in a flow direction, and an anisotropic property may occur in the physical property. However, in the present invention, it is possible to obtain a complicated shape while maintaining the isotropic property of the reinforcing fibers by using the aforementioned random mat. The charge rate of the base material is preferably 5 to 100% from Formula (3), and more preferably 20 to 95%. The charge rate of the base material is still more preferably 50 to 90%.

When a charge rate of the base material is less than 5%, since the base material is cooled while the base material flows during the molding process, it may be difficult to obtain a shaped product having a desired thickness. On the contrary, when a charge rate of the base material is higher than 100%, features of the present invention that the mold process is performed by flowing the base material in some degree are not implemented. Furthermore, when the charge rate of the base material is higher than 100%, since a trimming process is also needed in addition to an increase of loss of the base material, there are disadvantages in terms of productivity and cost.

<<Graining Mold>>

The graining mold used in the manufacturing method of the present invention has a grain-shaped part in a cavity of the mold corresponding to a portion of the shaped product where the grains are formed. The shape of the grains are not particularly limited, but may preferably be a concave and convex shape or a wrinkle shape, as described above, and a leather-like concave and convex shape or a leather-like wrinkle shape is especially preferable.

<<Random Mat>>

In the random mat used in the manufacturing method of the present invention, the reinforcing fibers having an average fiber length of 5 mm or more and 100 mm or less and the thermoplastic resin are included, a fiber areal weight of the reinforcing fibers is 25 to 10000 g/m², and preferably 25 to 3000 g/m², and a ratio of a reinforcing fiber bundle (A) including the reinforcing fibers of a critical number of single fiber or more, the critical number being defined by Formula (1), to the total amount of the reinforcing fibers in the random mat is 20 Vol % or more and 99 Vol % or less, and an average number of fibers (N) in the reinforcing fiber bundle (A) satisfies Formula (2). Detailed descriptions of the reinforcing fiber bundle (A), the thermoplastic resin, and the reinforcing fibers of the random mat are the same as those of the fiber-reinforced composite material constituting the shaped product described above, but the following descriptions are additionally provided.

In a plane of the random mat, the reinforcing fibers are not aligned in a specific direction but are dispersed and placed in random directions. Characteristics of the reinforcing fibers in the random mat, that is, a ratio of the reinforcing fiber bundle (A), an average number of fibers, a fiber areal weight, and an isotropic property of the reinforcing fiber bundle (A) are also maintained in the shaped product obtained using the random mat.

The random mat used in the manufacturing method of the present invention is preferably an isotropic material. When a shaped product is obtained using the random mat, an isotropic property of the reinforcing fibers in the random mat is also maintained in the shaped product. The shaped product is obtained using the random mat, and a tensile modulus ratio (Eδ) obtained by dividing the higher value by the lower value in two directions perpendicular to each other is obtained for the shaped product. Accordingly, the isotropic properties of the random mat and the shaped product obtained using the random mat can be quantitatively evaluated with obtaining the tensile modulus ratio (Eδ). When the ratio (Eδ) is 2 or lower, the shaped product is regarded as having a substantially isotropic property. When the ratio (Eδ) is not higher than 1.3, the shaped product is regarded as having an excellent isotropic property.

First, in the random mat used in the manufacturing method of the present invention, when a ratio of the reinforcing fiber bundle (A) to the total amount of the reinforcing fiber in the random mat is less than 20 Vol %, it is possible to obtain a shaped product having a high surface quality, but it is difficult to obtain a shaped product having an excellent mechanical property. When a ratio of the reinforcing fiber bundle (A) is higher than 99 Vol %, since entangled portions of the reinforcing fiber becomes locally thick, it is difficult to obtain a thin-walled shaped product. A ratio of the reinforcing fiber bundle (A) in the random mat is preferably 30 Vol % or more to less than 90 Vol %, and more preferably 30 Vol % or more to less than 80 Vol %.

As described above with regard to the reinforcing fiber composite material constituting the shaped product of the present invention, in the random mat, an average number of fibers (N) of the reinforcing fiber bundle (A) preferably satisfies Formula (2). When a random mat having an average number of fibers (N) of $0.7 \times 10^4/D^2$ or less is used, it may be difficult to provide a shaped product having a high volume fraction of reinforcing fibers (Vf). Further, when a random mat having an average number of fibers (N) of $1 \times 10^5/D^2$ or more is used, a thick portion may be locally formed, so that a void is caused. More preferably, the average number of fibers (N) of the reinforcing fiber bundle (A) satisfies Formula (2'), $$0.7 \times 10^4/D^2 < N < 6 \times 10^4/D^2 \qquad (2')$$

(wherein D is an average fiber diameter (μm) of single reinforcing fiber).

Furthermore, when an impregnation process and a molding process are performed using the random mat used in the manufacturing method of the present invention to obtain a thin-walled shaped product having a thickness of 1 mm or less, and also when simply separated fibers are used, it is difficult to obtain a shaped product having a satisfactory property with high unevenness in density. Further, when all fibers are opened, it becomes easy to obtain a thinner shaped product. However, since the fibers have many entangled portions, it is difficult to obtain a shaped product having a high volume fraction of reinforcing fibers. With the random mat including both the reinforcing fiber bundle (A) including the reinforcing fibers of a critical number of single fiber or more, the critical number being defined by Formula (1) and reinforcing fibers (B) including single fibers and a fiber bundles of less than the critical number of single fiber, it is possible to obtain a thin-walled shaped product having an excellent physical property. According to the manufacturing method of the present invention, it is suitable to provide shaped product having various thicknesses and it is suitable to obtain a thin-walled shaped product having a thickness of about 0.2 mm to about 1 mm.

The thickness of the random mat used in the manufacturing method of the present invention is not particularly limited, and may be 1 to 150 mm. Since the effect of the present invention that a thinner shaped product can be exhibited using the random mat of the present invention, the random mat may preferably have a thickness of 2 to 100 mm. In addition, the random mat may be reduced to an easy-to-use thickness by being appropriately pressurized or using a depressurization device, and then may be used in the next process.

Although a ratio of the reinforcing fibers to the thermoplastic resin in the random mat can be obtained from a ratio of supply amounts of the respective components at the time of manufacturing the random mat, the ratio of the reinforcing fibers to the thermoplastic resin in the shaped product may be actually measured by removing the thermoplastic resin in the sample through a burning and decomposing method or by a decomposing and dissolving method using chemical substances as previously described. Moreover, a procedure in which a volume fraction of reinforcing fibers (Vf) is calculated by calculating a volume of each component using a density of each component from a weight of each component is the same as previously described.

In the random mat used in the manufacturing method of the present invention, a volume fraction of reinforcing fibers (Vf) defined by Formula (4) with respect to thermoplastic resin and reinforcing fibers constituting the random mat is preferably 5 to 80%.

Volume fraction of reinforcing fibers (Vf)=100×volume of reinforcing fibers/(volume of reinforcing fibers+volume of thermoplastic resin)  (4)

The volume fraction of reinforcing fibers (Vf) indicates a composition of the reinforcing fibers and the thermoplastic resin included in the random mat, as described with regard to the shaped product. When the volume fraction of reinforcing fibers is lower than 5%, a reinforcing effect may not be sufficiently exhibited. Further, when the volume fraction of reinforcing fibers is higher than 80%, since a void is easily caused in the obtained shaped product, a physical property of the shaped product may be deteriorated. The volume fraction of reinforcing fibers is more preferably in a range of 20 to 60%.

When amounts of the reinforcing fibers and the thermoplastic resin included in the random mat used in the manufacturing method of the present invention are expressed in weights, the thermoplastic resin is in a range of preferably 50 to 1000 parts by weight, and more preferably 50 to 500 parts by weight based on 100 parts by weight of the reinforcing fibers. The thermoplastic resin is in a range of still more preferably 60 to 300 parts by weight based on 100 parts by weight of the reinforcing fibers. When a ratio of the thermoplastic resin to 100 parts by weight of the reinforcing fibers is less than 50 parts by weight, a void is easily caused in the obtained fiber-reinforced composite material, and thereby strength or rigidity may be deteriorated. On the contrary, when the ratio of the thermoplastic resin is more than 1000 parts by weight, the reinforcing effect of the reinforcing fibers may not be exhibited.

The random mat used in the manufacturing method of the present invention includes a solid thermoplastic resin, and serves as a preform for obtaining a shaped product. In the random mat, a thermoplastic resin may be preferably present in fibrous and/or particulate form. Since the reinforcing fibers and the thermoplastic resin in fibrous and/or particulate form are mixed, the fibers and the resin need not largely flow in the mold during an impregnation process, so that the thermoplastic resin can be easily impregnated. Two or more kinds of thermoplastic resins may be used, or thermoplastic resins in fibrous and/or particulate form may be used together as long as they can be compatible to each other.

As for a thermoplastic resin in fibrous form, a fineness may be in a range of preferably 100 to 5000 dtex and more preferably 1000 to 2000 dtex. Further, an average fiber length may be in a range of preferably 0.5 to 50 mm and more preferably 1 to 10 mm.

Examples of a thermoplastic resin in particulate form may preferably include spherical particles, fragment-shaped particles, or cylindrical particles such as pellets. Further, the thermoplastic resin may preferably have a strip shape formed by cutting a film. Preferably, the spherical thermoplastic may have a round shape, an ellipse shape, or an egg shape. In the case of the spherical thermoplastic resin, preferably, an average particle diameter is 0.01 to 1000 μm. More preferably, an average particle diameter is 0.1 to 900 μm, and still more preferably an average particle diameter is 1 to 800 μm. There is no particular limitation in particle diameter distribution, but more preferably a sharp particle diameter distribution is appropriate to obtain a thinner shaped product. A thermoplastic resin in particulate form in a desired diameter distribution can be obtained through classification.

The fragment-shaped thermoplastic resin may preferably have a cylindrical shape such as pellets, a prismatic shape, and a scale-like shape. In this case, an aspect ratio to some degree is allowable, but preferably a length is equivalent to that of the thermoplastic resin in fibrous form.

Further, in consideration of mass production, preferably, there may be used a method in which a molten thermoplastic resin is added to a mat including reinforcing fibers, and the reinforcing fibers and the thermoplastic resin are integrated with each other. According to this method, it is possible to easily proceed to a prepreg manufacturing process in which the resin is impregnated in the reinforcing fibers.

The random mat used in the present invention, particularly, the random mat having an isotropic property is preferably manufactured by a manufacturing method including a series of processes to be described below. Further, when a reinforcing fiber is cut in a cutting process, a width of a strand of the reinforcing fiber may be widened or a strand may be slit, so that an opening process may not be performed. Further, as described below, in a spray process, a mat-shaped material including reinforcing fibers may be obtained without using a thermoplastic resin, and a molten thermoplastic resin may be added to the mat-shaped material with an extruder. Also, to a random mat obtained by add a thermoplastic resin to the mat-shaped material in the spray process, a molten thermoplastic resin may be further added.

Cutting process: Process for cutting reinforcing fiber bundles

Opening process: Process for introducing the cut reinforcing fiber bundles into a tube and opening the reinforcing fiber bundles by blowing air thereto Spray process: Process for spraying the opened reinforcing fibers with a thermoplastic resin in fibrous or particulate form.

Hereinafter, the respective processes will be described in more detail.

Cutting Process

Specifically, in the cutting process for cutting reinforcing fiber bundles, the reinforcing fiber bundles are cut using a cutter. Preferably, the cutter may be a rotary cutter.

In order to obtain a fiber bundle having a desired size, it is preferred that a fiber bundle to be cut with a small strand width is used or a strand width is reduced by cutting the strand in a longitudinal direction. In this case, there may be preferably used a cutter having a blade parallel to a fiber direction in addition to a blade perpendicular to the fiber direction to cut the fiber bundle to a specific fiber length and to, at the same time, slit the fiber bundle in the longitudinal direction.

Preferably, the rotary cutter may be a spiral knife with an angle defined or a yarn separating knife. To obtain a random mat for reinforcing a thermoplastic resin, the random mat having an excellent surface quality, unevenness in fiber density is significant. In the conventional rotary cutter, since the reinforcing fiber is discontinuously cut, when the discontinuously cut fiber is introduced in the spray process, a fiber areal weight of the fiber is uneven. For this reason, by continuously cutting the reinforcing fiber by using the knife with an angle defined without a break, it is possible to spray so as to be unevenness in fiber density. A knife angle for continuously cutting the reinforcing fiber is geometrically calculated by a width of the reinforcing fiber used and a cut fiber length, and a relation between the width and the length is preferably represented by Formula (6), $$\text{Fiber length of reinforcing fiber (pitch of knife)} = \text{reinforcing fiber strand width} \times \tan(90 - \theta) \quad (6)$$

(wherein θ is an angle formed by circumferential direction and arrangement direction of knife).

Opening Process

In the opening process, the cut reinforcing fiber bundles are introduced into a tube and air is blown to the reinforcing fiber bundles to perform opening. A degree of opening can be appropriately controlled by a pressure of the air, and so on. The reinforcing opening method in manufacturing the random mat of the present invention is characterized in that air is blown to the reinforcing fiber bundles. In the opening process, the reinforcing fiber bundles can be opened more satisfactorily by directly blowing air to the fiber bundle at a wind velocity of preferably 1 to 1000 msec and more preferably 50 to 500 msec through compressed air blowing holes. Specifically, holes having a diameter of about 1 mm are made in several places in the tube through which the reinforcing fibers pass, and a pressure of about 0.2 to 0.8 MPa is applied from the outside to directly blow compressed air to the reinforcing fiber bundle, thereby easily opening the reinforcing fiber bundle.

Spray Process

In the spray process, the opened reinforcing fibers are sprayed together with the thermoplastic resin in fibrous or particulate form. In the spray process, the opened reinforcing fibers and the thermoplastic resin in fibrous or particulate form are sprayed onto a plane such as a table or sheet, so that it is possible to obtain a random mat having an isotropic property.

In the spray process, the supply amount of the thermoplastic resin is preferably 50 to 1000 parts by weight based on 100 parts by weight of the reinforcing fibers. The supply amount of the thermoplastic resin is more preferably 55 to 500 parts by weight based on 100 parts by weight of the reinforcing fibers, and still more preferably 60 to 300 parts by weight.

In spraying the reinforcing fibers, it is preferred to use a taper tube of a conical shape and so on. In the tube of a conical shape and so on, air is diffused to decrease a flow rate in the tube, and at this time, rotational force is given to the reinforcing fibers. The reinforcing fibers opened by utilizing this Venturi effect can be preferably scattered and sprayed.

By the above-described preferable method for manufacturing the random mat, it is possible to obtain the random mat made of the reinforcing fibers orientated two-dimensionally and containing few fibers whose long axes are three-dimensionally oriented.

Molten Resin Adding Process

It is preferably exemplified that the manufacturing method of the present invention may include a method in which by using an extruder, a molten thermoplastic resin is integrated with a mat including the reinforcing fibers obtained by performing the above-described spray process without using a thermoplastic resin. This method makes it possible to easily proceed to a prepreg manufacturing process in which the resin is allowed to be impregnated in the reinforcing fibers, and it is suitable for mass production. Further, a molten thermoplastic resin may be further added to a random mat obtained by performing the above-described spray process using a thermoplastic resin.

<<Prepreg>>

According to the present invention, when an impregnation process and a molding process including the steps A-1) to A-3) are performed, a prepreg is obtained by heating the random mat to a temperature equal to or higher than the melting point and lower than the decomposition temperature when the thermoplastic resin is crystalline or to a temperature equal to or higher than the glass transition temperature and lower than the decomposition temperature when the thermoplastic resin is amorphous to impregnate the thermoplastic resin into the reinforcing fibers, and the obtained prepreg is used for molding. A form of the reinforcing fibers in the prepreg is maintained as that in the random mat. That is, the reinforcing fibers in the prepreg maintain the same fiber length, isotropic property, and opening degree as those in the random mat and as described above with regard to the random mat.

The prepreg may undergo the step A-2) as it is without cooling, or the prepreg may undergo the step A-2) after a process in which the thermoplastic resin is impregnated into the reinforcing fibers and then solidification is performed. In the prepreg, the thermoplastic resin infiltrates into the reinforcing fiber bundle and between single fibers of the reinforcing fibers to be impregnated. As described above, in the random mat, since the reinforcing fibers and the thermoplastic resin in fibrous and/or particulate form are mixed and presented adjacent to each other, it is possible to easily impregnate the thermoplastic resin into the reinforcing fibers. The prepreg may have a thickness 1 to 10 times and preferably 1 to 5 times greater than a thickness of a target shaped product. The thickness is not limited, but may be preferably 0.1 mm or more. The upper limit of the thickness is not particularly limited as long as the prepreg can be appropriately arranged and be molded in the graining mold, and actually, it may be about 30 mm.

Further, the prepreg used in the manufacturing method of the present invention may have a void rate in a range of preferably 0 to 30%, and more preferably 0 to 10%. The prepreg may have a void rate in a range of still more preferably 0 to 5%, and most preferably 0 to 3%. The void rate of the prepreg is obtained by examining a cross section of the prepreg with an optical microscope and dividing an area of the void by a cross sectional area of the base material examined. Each prepreg is examined five times, and an average value of an examination result is determined as a void rate.

A value obtained by subtracting the void rate from 100 is a resin impregnation degree (%), and refers to a degree of the thermoplastic resin impregnated between the reinforcing fiber bundles in the prepreg.

<<Manufacturing Method by Cold Press Method Including Steps A-1) to A-3)>>

Hereinafter, a cold press method for performing an impregnation process and a molding process through the steps A-1) to A-3) will be described in detail.

In the step A-1), a prepreg is obtained by heating the random mat to a temperature equal to or higher than the melting point and lower than the decomposition temperature when the thermoplastic resin is crystalline or to a temperature equal to or higher than the glass transition temperature and lower than the decomposition temperature when the thermoplastic resin is amorphous, and impregnating the thermoplastic resin into the reinforcing fiber bundles and the reinforcing fibers. The obtained prepreg is used in the next step A-2) while maintaining a temperature at the time of the impregnation or after being left to be cooled and heated again. For example, a temperature of the prepreg can be measured by adhering a K-type thermocouple on a surface of the prepreg and using a measurement device provided outside a heating furnace.

In the next step A-2), the prepreg obtained in the step A-1) is arranged in a graining mold whose temperature is adjusted to a temperature lower than the melting point when the thermoplastic resin is crystalline or to a temperature lower than the glass transition temperature when the thermoplastic resin is amorphous so as to have a charge rate expressed by Formula (3) in a range of 5 to 100%, after the prepreg obtained in step A-1) is heated to a temperature equal to or higher than the melting point or lower than the decomposition temperature when the thermoplastic resin is crystalline or to a temperature equal to or higher than the glass transition temperature or lower than the decomposition temperature when the thermoplastic resin is amorphous. In this case, the prepreg layered to 1 layer or 2 to 100 layers may be arranged in the graining mold. When the prepregs are layered, the prepregs may be partially or entirely overlapped depending on a target shaped product. In this case, preferably, partial surfaces or the entire surfaces of ends of the prepregs are not in contact with an edge portion of the cavity of the mold. Furthermore, when the prepregs are layered, the prepregs do not need to have the same shape as long as they are partially or entirely overlapped.

A charge rate when the prepreg is arranged in the graining mold is preferably 5 to 100% from Formula (3), and more preferably 20 to 95%. Still more preferably, the charge rate of the prepreg is 50 to 90%.

At the time of arranging the prepreg in the graining mold, when a charge rate is less than 5%, and also when the prepreg pressurized flows in the graining mold during a molding process, it is likely to lose heat to the mold and may be solidified before a desired shape is formed.

At the time of arranging the prepreg in the graining mold, when a charge rate is more than 100%, it is possible to obtain a shaped product by filling the fibers to an end of the mold. However, when a complicated shape is molded, since the material may be tightened or tensioned during a molding process, it may be difficult to control. Therefore, it may be difficult to obtain a shaped product having a thickness as designed. Moreover, since unnecessary parts may remain at an end of a shaped product, a trimming process by surface texturing in the subsequent process may be needed, so that the process is complicated and also material loss is caused.

In the step A-2), when the prepreg is arranged in the graining mold with a charge rate in a range of 5% or more and 100% or less, it is possible to manufacture a lightweight shaped product with high productivity without material loss or a need for trimming while the reinforcing fibers actually maintain a random state (isotropic property) in the plane.

In the step A-2), preferably, the prepreg may be arranged at a horizontal part (0 degrees) of the graining mold or at an inclined part having an angle of 70 degrees or less with respect to the horizontal part. When the prepreg is arranged at the inclined part having an angle of more than 70 degrees with respect to the horizontal part of the graining mold, since a standing plane of the graining mold may be brought into contact with the prepreg at the time of closing mold during a molding process, the prepreg may be out of position, or the prepreg may be engaged with the standing plane, so that the molding process may not be normally performed.

Further, in the step A-2), at the time of arranging the prepreg as a base material in the graining mold, when the base material is arranged to avoid branched portions, and portions near corners and edges of a shaped product to be obtained, in which the prepregs are collected to be increased in thickness or wrinkle is easily caused, it is possible to obtain a shaped product having a remarkably uniform thickness.

A thickness of the prepreg may be appropriately selected depending on a thickness of the obtained shaped product. However, when a charge rate of the base material is 5% or more and 80% or less, preferably, a thickness of the prepreg or layered prepregs is 1.0 mm or more in order to make the prepreg adequately flow.

Furthermore, preferably, a temperature of the graining mold may be in a range of the melting point −200° C. or more to the melting point −10° C. or less when the thermoplastic resin is crystalline or in a range of the glass transition temperature −200° C. or more to the glass transition temperature −10° C. or less when the thermoplastic resin is amorphous. Accordingly, the shaped product obtained from the prepreg obtained in the step A-3) can be cooled to a temperature at which a shape is stabilized, and can be taken out from the graining mold.

Thereafter, in the step A-3), the prepreg arranged in the graining mold in the step A-2) is pressurized and molded. At this time, a pressure is in a range of preferably 0.1 MPa to 100 MPa, more preferably 0.2 MPa to 40 MPa, and still more preferably 0.5 MPa to 20 MPa. A time required to reach a target pressure is preferably 0.01 to 10 seconds.

After reaching the target pressure, the prepreg is pressurized for 5 to 200 seconds to be molded as described above. More preferably, the prepreg is pressurized for 10 to 60 seconds. In the meantime, the molding process is carried out by making the prepreg flow, and at the same time, the shaped product is cooled through heat exchange with the graining mold until a shape is stabilized. Thereafter, the mold is opened and the shaped product is obtained.

<<Manufacturing Method by Hot Press Method Including Steps B-1) to B-4)>>

Hereinafter, a hot press method for performing an impregnation process and a molding process through the steps B-1) to B-4) will be described in detail.

In the step B-1), the random mat is arranged in the graining mold so as to have a charge rate expressed by Formula (3) in a range of 5 to 100. The random mat of one layer or 2 to 100 layers overlapped may be arranged in the graining mold. In this case, the random mat may be used after being heated and/or pressurized to reduce capacity thereof. When overlapped, the random mats may be partially or entirely overlapped depending on a target shaped product. In this case, preferably, partial surfaces or the entire surfaces of ends of the random mats are not in contact with an edge portion of the cavity of the graining mold. In addition, when overlapped, the random mats do not need to have the same shape as long as they are partially or entirely overlapped. The reason for setting the range of the charge rate and the problem occurring when the charge rate is out of the range are the same as described above with regard to the prepreg in the step A-2) of the cold press method, and a charge rate at the time of arranging the random mat in the graining mold is preferably 5 to 100% from Formula (3), and more preferably, 20 to 95%. The charge rate of the random mat is still more preferably 50 to 90%.

In the step B-1), preferably, the random mat may be arranged at a horizontal part (0 degrees) of the graining mold or at an inclined part having an angle of 70 degrees or less with respect to the horizontal part. The problem occurring when the random mat is arranged at the inclined part having an angle of more than 70 degrees with respect to the horizontal part of the graining mold is the same as described above with regard to the prepreg in the step A-2) of the cold press method.

In the step B-1), as described above with regard to the arrangement of the prepreg in the step A-2) of the cold press method, at the time of arranging the random mat as a base material in the graining mold, when the base material is arranged to avoid branched portions, and portions near corners and edges of a shaped product to be obtained, in which the random mats are collected to be increased in thickness or wrinkle is easily caused during a molding process, it is possible to obtain a shaped product having a remarkably uniform thickness.

In the next step B-2), the graining mold is pressurized while being heated to a temperature equal to or higher than the melting point and lower than the decomposition temperature when the thermoplastic resin included in the random mat is crystalline or to a temperature equal to or higher than the glass transition temperature and lower than the decomposition temperature when the thermoplastic resin is amorphous, and the thermoplastic resin is impregnated into the reinforcing fibers (first press step).

In the next step B-3), a pressurizing process is carried out in at least one pressure step so as to a pressure of a final pressure step to be 1.2 to 100 times greater than the pressure of the first press step (second press step).

In the first press step, the random mat is pressurized to a predetermined pressure level for preferably 0.5 to 20 minutes and heated to a temperature equal to or higher than the melting point and lower than the decomposition temperature when the thermoplastic resin included in the random mat is crystalline or to a temperature equal to or higher than the glass transition temperature and lower than the decomposition temperature when the thermoplastic resin is amorphous to impregnate thermoplastic resin the reinforcing fiber bundle and between single fibers of the reinforcing fibers. Subsequently, a time required to shift to the second press step may be appropriately selected depending on performance of the molding machine and may be preferably in a range of 0.01 to 200 seconds to reduce a time for molding.

In the second press step, a pressure in one pressure step or multiple pressure steps is applied, and preferably, it may be applied in one pressure step for simplification of a molding process. A temperature of the mold in the second press step may be equal to the temperature of the mold in the first press step, or may be increased to a temperature in a range of the mold temperature+1° C. to less than the decomposition temperature. When the second press step is carried out in multiple pressure steps, the mold temperature during may be increased or decreased as press steps become later step, or heating and cooling may be carried out alternately.

A total time for pressing in the second press step is not particularly limited, but may be preferably in a range of 0.5 to 10 minutes to reduce a time for molding.

Moreover, a target pressure of the first press step is in a range of 0.1 MPa to 10 MPa and preferably 0.2 MPa to 8 MPa. A final target pressure of the second press step may be appropriately selected depending on performance of the molding machine and may be in a range of preferably 0.2 to 100 MPa, more preferably 0.3 to 50 MPa, and still more preferably 0.5 to 20 MPa. The final target pressure of the second press step is 1.2 to 100 times higher than the target pressure of the first press step. That is, preferably, a molding pressure in the steps B-2) and B-3) is in a range of 0.1 MPa to 100 MPa.

In the step B-4), the molding process is carried out by adjusting a temperature of the mold to be lower than the melting point when the thermoplastic resin included in the random mat is crystalline or to be lower than the glass transition temperature when the thermoplastic resin is amorphous. Preferably, a temperature of the mold after the adjustment may be in a range of the melting point −200° C. or more to the melting point −10° C. or less when the thermoplastic resin is crystalline or in a range of the glass transition temperature −200° C. or more to the glass transition temperature −10° C. or less when the thermoplastic resin is amorphous. A time required to perform this step can be appropriately controlled depending on a cooling condition, but may be preferably in a range of 0.5 to 20 minutes to reduce a time for molding. A method for adjusting a temperature of the mold is not particularly limited. Accordingly, the mold can be appropriately cooled by installing a line for adjusting a temperature in the mold and discharging a medium for cooling.

EXAMPLE

Hereinafter, the present invention will be described in detail in connection with Examples, but the present invention is not limited thereto.

In Reference Examples to be described below, polyamide 66 (hereinafter, abbreviated to PA 66, crystalline resin) had a melting point of 265° C. and a decomposition temperature (in the atmosphere) of 300° C., polypropylene (hereinafter, abbreviated to PP, amorphous resin) had a melting point of 170° C. and a decomposition temperature (in the atmosphere) of 300° C., and polycarbonate (hereinafter, abbreviated to PC, amorphous resin) had a glass transition temperature of 150° C. and a decomposition temperature (in the atmosphere) of 350° C. The decomposition temperatures are results measured through a thermo-gravimetric analysis.

Design thicknesses of the shaped products were 1.5 mm in Examples except that a design thickness of the shaped product was 3.0 mm in Example 2.

0) Analysis of Volume Fraction Ratio of Reinforcing Fiber and Resin in Random Mat A ratio of supply amounts (in a weight) of the reinforcing fibers and the resin at the time of manufacturing the random mat was regarded as a weight ratio of the reinforcing fibers and the resin in the random mat, and a volume fraction ratio of the reinforcing fibers and the resin was calculated based on the weight ratio by using a density of each component. A volume fraction of reinforcing fibers in the random mat is represented by Vf.

1) Analysis of Reinforcing Fiber Bundle in Random Mat

A random mat of 10 mm×10 mm to 100 mm×100 mm is cut. From the cut random mat, fiber bundles are all taken out with tweezers. The bundle number (I) of the reinforcing fiber bundles (A) and a length (Li) and a weight (Wi) of the reinforcing fiber bundles are measured and recorded. Fiber bundles which are too small to be taken out with the tweezers are collected together, and a weight (Wk) thereof is measured. To measure a weight, a balance which is capable of measuring down to 1/100 mg (0.01 mg) is used.

From a fiber diameter (D) of the reinforcing fibers used in the random mat, a critical number of single fiber is calculated, and the reinforcing fibers are divided into the reinforcing fiber bundles (A) including the reinforcing fibers of the critical number of single fiber or more and the others. Further, in the case where two or more kinds of reinforcing fibers are used, division is performed for each kind of fibers, and the measurement and the evaluation are performed for each.

A method for calculating an average number of fibers (N) in the reinforcing fiber bundles (A) is as follows.

A fiber number (Ni) in each reinforcing fiber bundle is determined from a fineness (F) of the reinforcing fibers used by the following formula. Here, the fineness (F) is represented by weight per length of a filament constituting the reinforcing fibers.

$$Ni=Wi/(Li \times F)$$

The average number of fibers (N) in the reinforcing fiber bundles (A) is determined from the bundle number (I) of the reinforcing fiber bundles (A) by the following formula.

$$N=\Sigma Ni/I$$

A ratio (VR) of the reinforcing fiber bundles (A) to the total amount of the reinforcing fibers in the random mat is determined using a density (ρ) of the reinforcing fibers by the following formula.

$$VR=\Sigma(Wi/\rho) \times 100/((Wk+\Sigma Wi)/\rho)$$

2) Analysis of Reinforcing Fiber Bundle in Shaped Product

Regarding a reinforcing fiber bundle included in the shaped product, after a resin was burned and removed from a furnace at 500° C. for about 1 hour, a measurement was carried out in the same manner as the measurement method of the random mat.

3) Analysis of Average Fiber Length of Reinforcing Fiber Contained in Random Mat Regarding an average fiber length of the reinforcing fiber contained in the obtained shaped product, after a resin was removed in a furnace at 500° C. for about 1 hour, lengths of 100 reinforcing fibers randomly extracted from a random mat were measured down to the millimeter with a venire caliper and a loupe and recorded. From the lengths (Li, where i is an integer of 1 to 100) of all reinforcing fibers measured, an average fiber length (La) of reinforcing fibers contained in the obtained shaped product was determined by the following formula.

$$La=\Sigma Li/100$$

An average fiber length of the reinforcing fibers in the random mat may be measured in the same manner as the aforementioned method.

4) Analysis of Volume Fraction Ratio of Fiber and Resin in Shaped Product

With a shaped product, by burning and removing a resin from a furnace at 500° C. for about 1 hour and measuring a weight of a sample before and after the treatment, weights of the reinforcing fibers and the resin were obtained. Thereafter, a volume fraction ratio of the reinforcing fibers and the resin was calculated using a specific gravity of each component. Furthermore, with regard to the shaped product, a volume fraction ratio of the contained reinforcing fiber is represented by Vf.

5) Tensile Test

Test specimens were cut out of a shaped product by using water-jet, and tensile strength and tensile modulus were measured by referring to JIS K 7164:2005 and using a Tensilon universal testing machine manufactured by A&D Company, Limited. An A type test specimen or a test specimen equivalent thereto was used as the test specimen. A distance between chucks was about 115 mm, and a test speed was 2 mm/minute. The test specimen was cut in an arbitrary direction (0-degree direction) of the shaped product and a direction (90-degrees direction) perpendicular to the arbitrary direction, and tensile strength and tensile modulus in the two directions were measured. Further, with regard to the tensile modulus, a ratio (Eδ) obtained by dividing the higher value by the lower value of values of the measured tensile modulus was calculated.

6) Evaluation of Surface Appearance

In order to evaluate a surface appearance of a shaped product, a surface of the shaped product was observed through a visual inspection with a laser microscope and an optical microscope at a low magnification. Magnification was 5 to 100 times. A case where the shaped product had desired grains and the surface appearance was good was represented by Good, and a case where desired grains are not formed due to many defects and the surface appearance is not bad was represented by NG (No Good).

7) Fiber Impregnation Degree in Prepreg and Shaped Product

Regarding fiber impregnation degrees in a prepreg and a shaped product, after void rates were measured in the prepreg and the shaped product, values obtained by subtracting the void rates from 100 were respectively evaluated as a fiber impregnation degree (%). The void rates of prepreg and the shaped product were calculated by examining cross sections of these test specimens with an optical microscope and dividing areas of the voids by cross sectional areas of the test specimens examined. Each test specimen was examined five times, and an average value of an examination result was determined as a void rate.

Reference Example 1

Carbon fibers (Tenax (registered trade mark) STS40-24KS (average fiber diameter: 7 µm, strand width: 10 mm) manufactured by Toho Tenax Co., Ltd.) were used as reinforcing fibers. The carbon fibers were cut to a length of 10 mm while being widened in a width of 20 mm, and introduced into a taper tube at a supply rate of the carbon fibers of 301 g/min, and while air was blown to the carbon fibers in the taper tube to partially open the fiber bundle, the carbon fibers were sprayed onto a table provided under an outlet of the taper tube.

In addition, a PA 66 fiber (a polyamide 66 fiber manufactured by Asahi Kasei Fibers Corporation: T5 nylon, fineness: 1400 dtex), which was dry-cut to a length of 2 mm, was supplied as a matrix resin into the taper tube at a rate of 430 g/min, and sprayed together with the carbon fibers. Accordingly, a random mat in which the carbon fibers having an average fiber length of 10 mm and the PA 66 were mixed was obtained. In the random mat, a volume fraction ratio (Vf) of the reinforcing fibers (carbon fibers) was 30%, and a fiber areal weight of the reinforcing fibers was 317 g/m².

According to a result of measuring an average fiber length (La), a ratio of the reinforcing fiber bundle (A) in the obtained random mat, and an average number of fibers (N), the average fiber length (La) was 10 mm, a critical number of single fiber defined by Formula (1) was 86, a ratio of the reinforcing fiber bundle (A) to the total amount of the reinforcing fibers in the random mat was 35 Vol %, and an average number of fibers (N) in the reinforcing fiber bundle (A) was 240. According to a result of observing a form of the reinforcing fibers in the random mat, a fiber axis of the reinforcing fibers was substantially parallel to a surface, and the reinforcing fibers were randomly dispersed in-plane.

Reference Example 2

Carbon fibers (Tenax (registered trade mark) IMS60-12K (average fiber diameter: 5 µm, strand width: 6 mm) manufactured by Toho Tenax Co., Ltd.) were used as reinforcing fibers. The carbon fibers were cut to a length of 20 mm, and introduced into a taper tube at a supply rate of the carbon fibers of 1222 g/min, and while air was blown to the carbon fibers in the taper tube to partially open the fiber bundle, the carbon fibers were sprayed onto a table provided under an outlet of the taper tube.

In addition, a PP resin (polypropylene manufactured by Prime Polymer Co., Ltd: Prime Polypro J108M), which was obtained by freeze-pulverizing into an average particle diameter of about 1 mm, was supplied as a matrix resin into the taper tube at a supply rate of 2527 g/min, and sprayed together with the carbon fibers. Accordingly, a random mat in which the carbon fibers having an average fiber length of 20 mm and the PP were mixed was obtained. In the random mat, a volume fraction ratio (Vf) of the reinforcing fibers (carbon fibers) was 20%, and a fiber areal weight of the reinforcing fibers was 1056 g/m².

According to a result of measuring an average fiber length (La), a ratio of the reinforcing fiber bundle (A) in the obtained random mat, and an average number of fibers (N), the average fiber length (La) was 20 mm, a critical number of single fiber defined by Formula (1) was 120, a ratio of the reinforcing fiber bundle (A) to the total amount of the reinforcing fibers in the random mat was 86 Vol %, and an average number of fibers (N) in the reinforcing fiber bundle (A) was 900. According to a result of observing a form of the reinforcing fibers in the random mat, a fiber axis of the reinforcing fibers was substantially parallel to a surface, and the reinforcing fibers were randomly dispersed in-plane.

Reference Example 3

Glass fibers (EX-2500 (average fiber diameter: 15 µm, strand width: 9 mm) manufactured by Nippon Electric Glass Co., Ltd.) were used as reinforcing fibers. The glass fibers were cut to a length of 50 mm, and introduced into a taper tube at a supply rate of the glass fibers of 412 g/min, and while air was blown to the glass fibers in the taper tube to partially open the fiber bundle, the glass fibers were sprayed onto a table provided under an outlet of the taper tube.

In addition, a PC resin (a polycarbonate resin manufactured by Teijinkasei Co., Ltd: Panlite (registered trade mark) L-1225L), which was obtained by freeze-pulverizing into an average particle diameter of about 710 µm, was supplied as a matrix resin into the taper tube at a supply rate of 791 g/min, and sprayed together with the glass fibers. Accordingly, a random mat in which the glass fibers having an average fiber length of 50 mm and the PC were mixed was obtained. In the random mat, a volume fraction ratio (Vf) of the reinforcing fibers (glass fibers) was 20%, and a fiber areal weight of the reinforcing fibers was 300 g/m$^2$.

According to a result of measuring an average fiber length (La), a ratio of the reinforcing fiber bundle (A) in the obtained random mat, and an average number of fibers (N), the average fiber length (La) was 50 mm, a critical number of single fiber defined by Formula (1) was 40, a ratio of the reinforcing fiber bundle (A) to the total amount of the reinforcing fibers in the random mat was 68 Vol %, and an average number of fibers (N) in the reinforcing fiber bundle (A) was 60. According to a result of observing a form of the reinforcing fibers in the random mat, a fiber axis of the reinforcing fibers was substantially parallel to a surface, and the reinforcing fibers were randomly dispersed in-plane.

Reference Example 4

Carbon fibers (Tenax (registered trade mark) STS40-24KS (average fiber diameter: 7 μm, strand width: 10 mm) manufactured by Toho Tenax Co., Ltd.) were used as reinforcing fibers. The carbon fibers were cut to a length of 10 mm which being widened in a width of 20 mm, and introduced into a taper tube at a supply rate of the carbon fibers of 301 g/min, and the carbon fibers were sprayed onto a table provided under an outlet of the taper tube without blowing air to the carbon fibers in the taper tube.

In addition, a PA 66 fiber (a polyamide 66 fiber manufactured by Asahi Kasei Fibers Corporation: T5 nylon, fineness: 1400 dtex), which was dry-cut to a length of 2 mm, was supplied as a matrix resin into the taper tube at a supply rate of 430 g/min, and sprayed together with the carbon fibers. Accordingly, a random mat in which the carbon fibers having an average fiber length of 10 mm and the PA 66 were mixed was obtained. In the random mat, a volume fraction ratio (Vf) of the reinforcing fibers (carbon fibers) was 30%, and a fiber areal weight of the reinforcing fibers was 317 g/m$^2$.

According to a result of measuring an average fiber length (La), a ratio of the reinforcing fiber bundle (A) in the obtained random mat and an average number of fibers (N), the average fiber length (La) was 10 mm, a critical number of single fiber defined by Formula (1) was 86, a ratio of the reinforcing fiber bundle (A) to the total amount of the reinforcing fibers in the random mat was 100 Vol %, and an average number of fibers (N) in the reinforcing fiber bundle (A) was 24000.

Reference Example 5

A random mat in which carbon fibers having an average fiber length of 10 mm and PA 66 were mixed was obtained by performing an operation in the same conditions as Reference Example 1 except that after carbon fibers are widened in a width of 20 mm, the carbon fibers were cut to a fiber length of 10 mm while being slit to a width of 0.5 mm in a longitudinal direction by using a longitudinal slit device and air was not blown to the carbon fibers in the taper tube to open the fiber bundle. In the random mat, a volume fraction ratio (Vf) of the reinforcing fibers (carbon fibers) was 30%, and a fiber areal weight of the reinforcing fibers was 317 g/m$^2$.

According to a result of measuring an average fiber length (La), a ratio of the reinforcing fiber bundle (A) in the obtained random mat, and an average number of fibers (N), the average fiber length (La) was 10 mm, a critical number of single fiber defined by Formula (1) was 86, a ratio of the reinforcing fiber bundle (A) to the total amount of the reinforcing fibers in the random mat was 90 Vol %, and an average number of fibers (N) in the reinforcing fiber bundle (A) was 1500. According to a result of observing a form of the reinforcing fibers in the random mat, a fiber axis of the reinforcing fibers was substantially parallel to a surface, and the reinforcing fibers were randomly dispersed in-plane.

Reference Example 6

A random mat in which carbon fibers having an average fiber length of 10 mm and PA 66 were mixed was obtained by performing an operation in the same conditions as Reference Example 1 except that the amount of air blown into a taper tube was largely decreased. In the random mat, a volume fraction ratio (Vf) of the reinforcing fibers (carbon fibers) was 30%, and a fiber areal weight of the reinforcing fibers was 317 g/m$^2$. An average fiber length (La) of the obtained random mat was 10 mm, a critical number of single fiber was 86, a ratio of the reinforcing fiber bundle (A) to the total amount of the reinforcing fibers in the random mat was 85 Vol %, and an average number of fibers (N) in the reinforcing fiber bundle (A) was 2400. A fiber axis of the reinforcing fibers was substantially parallel to a surface, and the reinforcing fibers were randomly dispersed in-plane.

Reference Example 7

Carbon fibers (Tenax (registered trade mark) STS40-24KS (average fiber diameter: 7 μm, strand width: 10 mm) manufactured by Toho Tenax Co., Ltd.) were used as reinforcing fibers. The carbon fibers were slit to a width of 2 mm or less by using a longitudinal slit device and then cut to a fiber length of 20 mm. As a cutting device, there was used a rotary cutter capable of continuously cutting the reinforcing fibers. Strands passing through the device were introduced into a taper tube and air was blown to partially open the fiber bundle. Thereafter, the treated carbon fibers were sprayed onto a table movable in XY directions provided under an outlet of the taper tube with suctioning from a lower portion of the table with a blower, thereby manufacturing a carbon fiber mat.

Subsequently, a molten matrix resin was supplied to the obtained carbon fiber mat. A PA 6 resin, A1030, manufactured by Unitika Ltd. was used as the matrix resin and melted by an extruder and then supplied from a T-die to the entire surface of the random mat. At this time, places on the mat supplied with the resin were heated with an infrared heater to prevent the resin from being cooled and solidified. The apparatus was operated at a supply rate of the reinforcing fibers of 301 g/min and a supply rate of the PA 6 resin of 450 g/min, and a random mat including the carbon fibers and the PA 6 resin was manufactures. In the random mat, a volume fraction ratio (Vf) of the reinforcing fibers (carbon fibers) was 30%, and a fiber areal weight of the reinforcing fibers was 317 g/m$^2$. Moreover, the average fiber length (La) of the reinforcing fibers in the random mat was 20 mm, a critical number of single fiber was 86, a ratio of the reinforcing fiber bundle (A) to the total amount of the reinforcing fibers in the random mat was 35 Vol %, and an average number of fibers (N) in the reinforcing fiber bundle (A) was 240. A fiber axis of the reinforcing fibers in the random mat was substantially parallel to a surface, and the reinforcing fibers were randomly dispersed in-plane.

Reference Example 8

A random mat in which carbon fibers having an average fiber length of 20 mm and PA 6 were mixed was obtained by performing an operation in the same conditions as Reference Example 1 except that carbon fibers were cut in a length of 20 mm, a PA 6 resin, A1030 (a pulverized material, average particle diameter: about 0.5 mm), manufactured by Unitika Ltd. was used as a matrix resin and supplied in at a supply rate of 235 g/min, and the amount of air blown into the taper tube was adjusted. In the random mat, a volume fraction ratio (Vf) of the reinforcing fibers (carbon fibers) was 45%, and a fiber areal weight of the reinforcing fibers was 317 g/m$^2$. The average fiber length (La) of the obtained random mat was 20 mm, a critical number of single fiber was 86, a ratio of the reinforcing fiber bundle (A) to the total amount of the reinforcing fibers in the random mat was 35 Vol %, and an average number of fibers (N) in the reinforcing fiber bundle (A) was 240. A fiber axis of the reinforcing fibers was substantially parallel to a surface, and the reinforcing fibers were randomly dispersed in-plane.

Reference Example 9

A random mat in which carbon fibers having an average fiber length of 10 mm and a polybutylene terephthalate resin were mixed was obtained by performing an operation in the same conditions as Reference Example 1 except that a polybutylene terephthalate resin (Duranex (registered trademark) 700FP manufactured by Polyplastics Co., Ltd., melting point: 230° C., decomposition temperature: 300° C.) used as the matrix resin was obtained by freeze-pulverizing into an average particle diameter of about 1 mm and the matrix resin was supplied into a taper tube at a supply rate of 523 g/min. In the random mat, a volume fraction ratio (Vf) of the reinforcing fibers (carbon fibers) was 30%, and a fiber areal weight of the reinforcing fibers was 317 g/m$^2$.

According to a result of measuring an average fiber length (La), a ratio of the reinforcing fiber bundle (A) in the obtained random mat, and an average number of fibers (N), the average fiber length (La) was 10 mm, a critical number of single fiber defined by Formula (1) was 86, a ratio of the reinforcing fiber bundle (A) to the total amount of the reinforcing fibers in the random mat was 35 Vol %, and an average number of fibers (N) in the reinforcing fiber bundle (A) was 240. According to a result of observing a form of the reinforcing fibers in the random mat, a fiber axis of the reinforcing fibers was substantially parallel to a surface, and the reinforcing fibers were randomly dispersed in-plane.

Reference Example 10

A random mat in which carbon fibers having an average fiber length of 10 mm and PA 66 were mixed was obtained by performing an operation in the same conditions as Reference Example 1 except that the amount of air blown into the taper tube was increased. In the random mat, a volume fraction ratio (Vf) of the reinforcing fibers (carbon fibers) was 30%, and a fiber areal weight of the reinforcing fibers was 317 g/m$^2$. The average fiber length (La) of the obtained random mat was 10 mm, a critical number of single fiber was 86, a ratio of the reinforcing fiber bundle (A) to the total amount of the reinforcing fibers in the random mat was 10 Vol %, and an average number of fibers (N) in the reinforcing fiber bundle (A) was 100. According to a result of observing a form of the reinforcing fibers in the random mat, a fiber axis of the reinforcing fibers was substantially parallel to a surface, and the reinforcing fibers were randomly dispersed in-plane.

Reference Example 11

A random mat in which carbon fibers having an average fiber length of 2 mm and PA 66 were mixed was obtained by performing an operation in the same conditions as Reference Example 1 except that the carbon fibers were cut in a length of 2 mm and the amount of air blown into the taper tube was decreased. In the random mat, a volume fraction ratio (Vf) of the reinforcing fibers (carbon fibers) was 30%, and a fiber areal weight of the reinforcing fibers was 317 g/m$^2$. The average fiber length (La) in the obtained random mat was 2 mm, a critical number of single fiber was 86, a ratio of the reinforcing fiber bundle (A) to the total amount of the reinforcing fibers in the random mat was 25 Vol %, and an average number of fibers (N) in the reinforcing fiber bundle (A) was 200. According to a result of observing a form of the reinforcing fibers in the random mat, a fiber axis of the reinforcing fibers was substantially parallel to a surface, and the reinforcing fibers were randomly dispersed in-plane.

Reference Example 12

A random mat in which carbon fibers having an average fiber length of 200 mm and PA 66 were mixed was obtained by performing an operation in the same conditions as Reference Example 1 except that the carbon fibers were cut in a length of 200 mm and the amount of air blown into the taper tube was increased. In the random mat, a volume fraction ratio (Vf) of the reinforcing fibers (carbon fibers) was 30%, and a fiber areal weight of the reinforcing fibers was 317 g/m$^2$. The average fiber length (La) in the obtained random mat was 200 mm, a critical number of single fiber was 86, a ratio of the reinforcing fiber bundle (A) to the total amount of the reinforcing fibers in the random mat was 90 Vol %, and an average number of fibers (N) in the reinforcing fiber bundle (A) was 1500. A fiber axis of the reinforcing fibers in the random mat was substantially parallel to a surface, and the reinforcing fibers were randomly dispersed in-plane.

Reference Example 13

A random mat in which carbon fibers having an average fiber length of 10 mm and PA 66 were mixed was obtained by performing an operation in the same conditions as Reference Example 1 except that carbon fibers were supplied at a supply rate of 12160 g/min, the PA 66 was supplied at a supply rate of 17410 g/min, and the amount of air blown into the taper tube was increased. In the random mat, a volume fraction ratio (Vf) of the reinforcing fibers (carbon fibers) was 30%, and a fiber areal weight of the reinforcing fibers was 15000 g/m$^2$. The average fiber length (La) of the obtained random mat was 10 mm, a critical number of single fiber was 86, a ratio of the reinforcing fiber bundle (A) to the total amount of the reinforcing fibers in the random mat was 95 Vol %, and an average number of fibers (N) in the reinforcing fiber bundle (A) was 1700. A fiber axis of the reinforcing fibers in the random mat was substantially parallel to a surface, and the reinforcing fibers were randomly dispersed in-plane.

Reference Example 14

A random mat in which carbon fibers having an average fiber length of 10 mm and PA 66 were mixed was obtained by performing an operation in the same conditions as Reference Example 1 except that the carbon fibers were supplied at a supply rate of 19 g/min, the PA 66 was supplied at a supply rate of 27 g/min, and the amount of air blown into the taper tube was considerably decreased. In the random mat, a volume fraction ratio (Vf) of the reinforcing fibers (carbon fibers) was 30%, and a fiber areal weight of the reinforcing fibers was 23 g/m². The average fiber length (La) of the obtained random mat was 10 mm, a critical number of single fiber was 86, a ratio of the reinforcing fiber bundle (A) to the total amount of the reinforcing fibers in the random mat was 50 Vol %, and an average number of fibers (N) in the reinforcing fiber bundle (A) was 500. A fiber axis of the reinforcing fibers in the random mat was substantially parallel to a surface, and the reinforcing fibers were randomly dispersed in-plane.

As will be described in Examples and Comparative Examples, the random mats manufactured in Reference Examples described above are impregnated and molded using a 500 t hydraulic press machine manufactured by Kawasaki Hydromechanics Corporation. A graining mold used in a molding process was a flat mold having a cavity where grain-shaped portion is presented and longitudinal and lateral dimensions illustrated in FIGS. 1 to 4. Design thicknesses of the shaped products in Examples and Comparative Examples are 1.5 mm except that a design thickness in Example 2 was 3.0 mm.

Example 1

The random mat manufactured in Reference Example 1 was hot-pressed at a temperature of 300° C. and a pressure of 4 MPa for 5 minutes by using a press machine, manufactured by Kawasaki Hydromechanics Corporation, to which a flat mold for impregnation was set. Subsequently, the random mat was cooled down to 50° C., so that a prepreg having a resin impregnation degree of 99%, a thickness of 0.6 mm, a volume fraction ratio of the reinforcing fibers (carbon fibers) of 30%, and a fiber areal weight of the reinforcing fibers of 317 g/m² was obtained.

Thereafter, three sheets of the obtained prepreg heated to 300° C. by using an IR oven manufactured by NGK KILN TECH, Corporation were overlapped, and were arranged in a grain-shaped graining mold as illustrated in FIG. 1 in which a mold temperature was set to 230° C. so as to have a charge rate of 80% and then cold-pressed at a pressure of 10 MPa for 60 seconds.

Moldability was good, and a volume fraction of reinforcing fibers (Vf) of the obtained shaped product was 30%. The obtained shaped product had desired grains and good surface appearance (Good). According to a result of measuring an average fiber length (La), a ratio of the reinforcing fiber bundle (A) of the shaped product, and an average number of fibers (N), the average fiber length (La) was 10 mm, a critical number of single fiber was 86, a ratio of the reinforcing fiber bundle (A) to the total amount of the reinforcing fibers was 35 Vol %, and an average number of fibers (N) in the reinforcing fiber bundle (A) was 240.

It was confirmed that there was no difference between tensile properties of specimens cut out of the shaped product in a reference direction and a direction perpendicular to the reference direction and the specimens had an isotropic property. An evaluation result of the shaped product was represented in Table 1.

Example 2

The random mat manufactured in Reference Example 2 was hot-pressed at a temperature of 220° C. and a pressure of 3 MPa for 5 minutes by using a press machine, manufactured by Kawasaki Hydromechanics Corporation, to which a flat mold for impregnation was set. Subsequently, the random mat was cooled down to 50° C., so that a prepreg having a resin impregnation degree of 99%, a thickness of 3.4 mm, a volume fraction ratio of the reinforcing fibers (carbon fibers) of 20%, and a fiber areal weight of the reinforcing fibers of 1056 g/m² was obtained.

Subsequently, the obtained prepreg (composite material base) was heated to 220° C. by using an IR oven manufactured by NGK KILN TECH, Corporation, was arranged in a grain-shaped graining mold as illustrated in FIG. 1 in which a mold temperature was set to 120° so as to have a charge rate of 90%, and then cold-pressed a pressure of 10 MPa for 60 seconds.

Moldability was good, and a volume fraction of reinforcing fibers (Vf) of the obtained shaped product was 20%. The obtained shaped product had desired grains and good surface appearance (Good). According to a result of measuring an average fiber length (La), a ratio of the reinforcing fiber bundle (A) of the shaped product, and an average number of fibers (N), the average fiber length (La) was 20 mm, a critical number of single fiber was 120, a ratio of the reinforcing fiber bundle (A) to the total amount of the reinforcing fibers in the random mat was 86 Vol %, and an average number of fibers (N) in the reinforcing fiber bundle (A) was 900.

It was confirmed that there was no difference between tensile properties of test specimens cut out of the shaped product in a reference direction and a direction perpendicular to the reference direction and the test specimens had an isotropic property. An evaluation result of the shaped product is represented in Table 1.

Example 3

Figure 2:
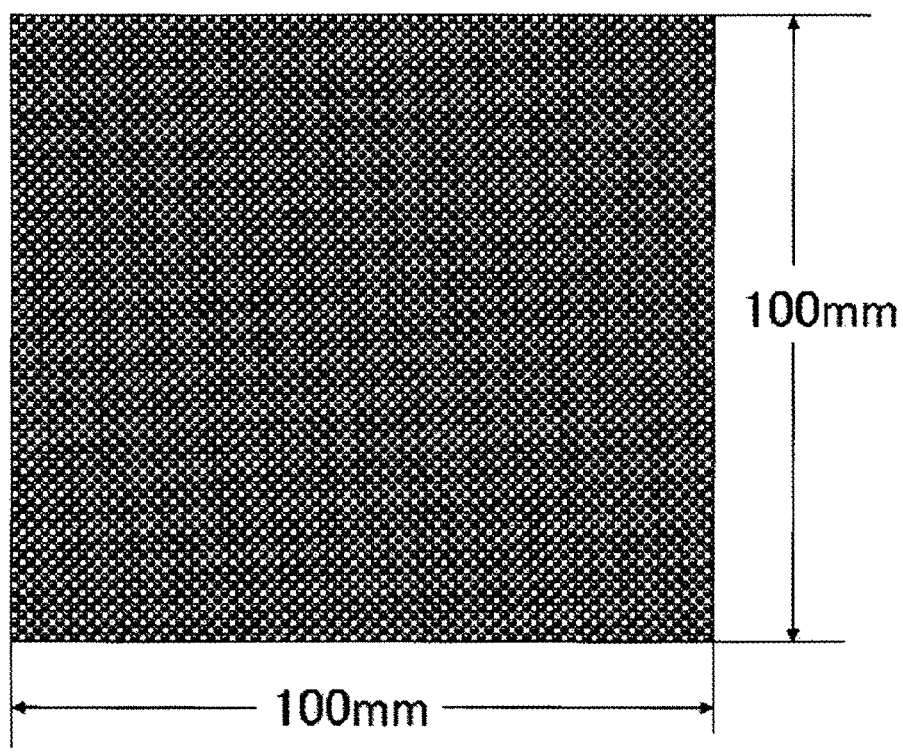
FIG. 2 is a schematic diagram of a surface including grains having a concave and convex pattern, a convex density of 10 convexes/20 mm, a depth of 150 μm, and a draft angle of 10 degrees in a shaped product obtained through Example 3, and a graining mold including a cavity having a surface to which the grain shape is transferred is used in Example 3.

Three sheets of the random mat manufactured in Reference Example 3 were overlapped and were arranged in a coarse grain-shaped graining mold as illustrated in FIG. 2 having a charge rate of 80%. Thereafter, the random mat was pressurized at a temperature of 300° C. and a pressure of 5 MPa for 7 minutes by using a press machine manufactured by Kawasaki Hydromechanics Corporation (first press step). Then, the pressure is slowly raised for 2 minutes, and the random mat was pressurized at a pressure of 10 MPa for 1 minute (second press step). Subsequently, the random mat was cooled down to 50° C., so that a prepreg having a resin impregnation degree of 99%, a volume fraction ratio of the reinforcing fibers (glass fibers) of 20%, and a fiber areal weight of the reinforcing fibers of 900 g/m² was obtained.

The obtained shaped product had desired grains and good surface appearance (Good). According to a result of measuring an average fiber length (La), a ratio of the reinforcing fiber bundle (A) of the shaped product, and an average number of fibers (N), the average fiber length (La) was 50 mm, a critical number of single fiber was 40, a ratio of the reinforcing fiber bundle (A) to the total amount of the reinforcing fibers was 68 Vol %, and an average number of fibers (N) in the reinforcing fiber bundle (A) was 60.

It was confirmed that there was no difference between tensile properties of test specimens cut out of the shaped product in a reference direction and a direction perpendicular to the reference direction and the test specimens had an isotropic property. An evaluation result of the shaped product is represented in Table 1.

Comparative Example 1

Similarly to Example 1, the random mat manufactured in Reference Example 4 was hot-pressed at a temperature of 300° C. and a pressure of 4 MPa for 5 minutes by using a press machine, manufactured by Kawasaki Hydromechanics Corporation, to which a flat mold for impregnation was set. Subsequently, the random mat was cooled down to 50° C., so that a shaped product having a resin impregnation degree of 99%, a thickness of 0.6 mm, a volume fraction ratio of the reinforcing fibers (carbon fibers) of 30%, and a fiber areal weight of the reinforcing fibers of 317 g/m² was obtained.

Thereafter, three sheets of the obtained prepreg heated to 300° C. by using an IR oven manufactured by NGK KILN TECH, Corporation were overlapped similarly to Example 1, and was arranged in a grain-shaped graining mold as illustrated in FIG. 1 in a mold temperature was set to 120° C. so as to have a charge rate of 80% and then cold-pressed a pressure of 10 MPa for 60 seconds.

Since the obtained shaped product was non-uniform in thickness, had many defects, and did not have desired grains, a surface appearance was bad (No Good). An evaluation result of the shaped product is represented in Table 1.

Example 4

Figure 3:
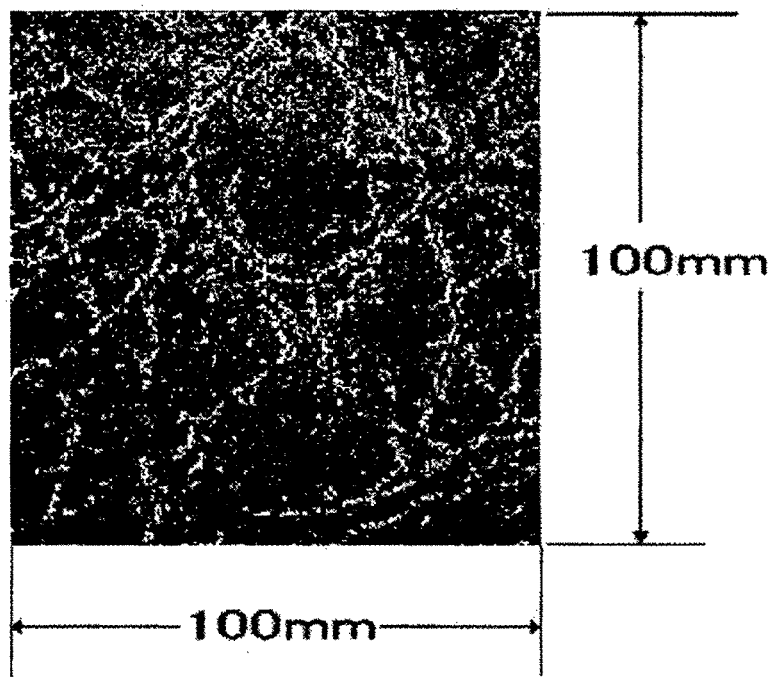
FIG. 3 is a photograph of a surface having leather-like grains of a shaped product obtained through Example 4 (a depth of 225 μm, a draft angle of 23 degrees).

An operation was performed in the same conditions as Example 1 except that the grain-shaped graining mold as illustrated in FIG. 3 was used, five sheets of the prepreg were overlapped, and a charge rate was 50%.

Moldability was good, and a volume fraction ratio (Vf) of the reinforcing fibers of the obtained shaped product was 30%. The obtained shaped product had desired grains and good surface appearance (Good). A average fiber length (La) of the shaped product was 10 mm, a critical number of single fiber was 86, a ratio of the reinforcing fiber bundle (A) to the total amount of the reinforcing fibers was 35 Vol %, and an average number of fibers (N) in the reinforcing fiber bundle (A) was 240. It was confirmed that there was no difference between tensile properties of test specimens cut out of the shaped product in a reference direction and a direction perpendicular to the reference direction and the test specimens had an isotropic property. An evaluation result of the shaped product is represented in Table 2.

Example 5

Figure 4:
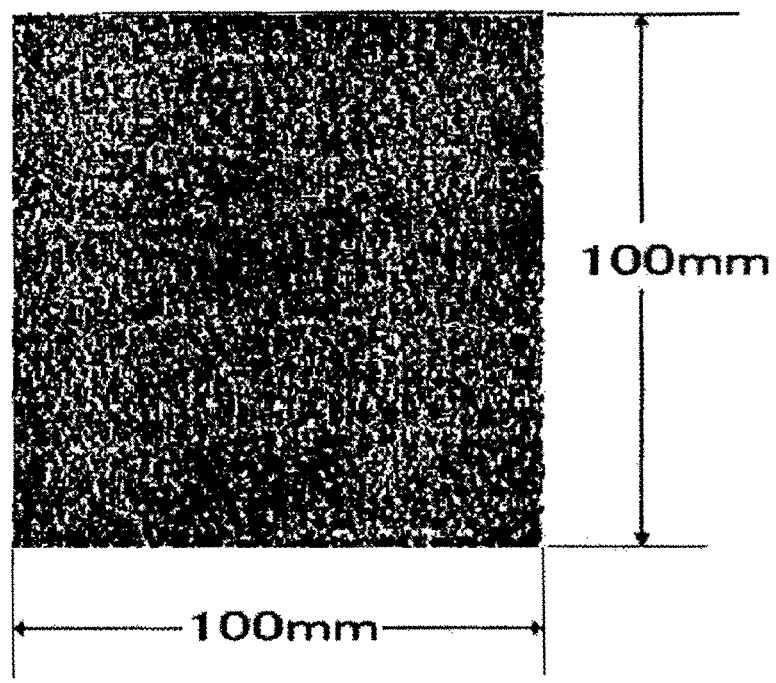
FIG. 4 is a photograph of a surface having leather-like grains of a shaped product obtained through Example 5 (a depth of 110 μm, a draft angle of 11 degrees).

An operation was performed in the same conditions as Example 1 except that the grain-shaped graining mold as illustrated in FIG. 4 was used, five sheets of the prepreg were overlapped, and a charge rate was 50%.

Moldability was good, and a volume fraction ratio (Vf) of the reinforcing fibers of the obtained shaped product was 30%. The obtained shaped product had desired grains and good surface appearance (Good). An average fiber length (La) of the shaped product was 10 mm, a critical number of single fiber was 86, a ratio of the reinforcing fiber bundle (A) to the total amount of the reinforcing fibers was 35 Vol %, and an average number of fibers (N) in the reinforcing fiber bundle (A) was 240. It was confirmed that there was no difference between tensile properties of test specimens cut out of the shaped product in a reference direction and a direction perpendicular to the reference direction and the test specimens had an isotropic property. An evaluation result of the shaped product is represented in Table 2.

Example 6

An operation was performed in the same conditions as Example 1 except that the random mat manufactured in Reference Example 5 was used.

Moldability was good, and a volume fraction ratio (Vf) of the reinforcing fibers of the obtained shaped product was 30%. The obtained shaped product had desired grains and good surface appearance (Good). An average fiber length (La) of the shaped product was 10 mm, a critical number of single fiber was 86, a ratio of the reinforcing fiber bundle (A) to the total amount of the reinforcing fibers in the random mat was 90 Vol %, and an average number of fibers (N) in the reinforcing fiber bundle (A) was 1500. It was confirmed that there was no difference between tensile properties of test specimens cut out of the shaped product in a reference direction and a direction perpendicular to the reference direction and the test specimens had an isotropic property. An evaluation result of the shaped product was represented in Table 2.

Example 7

An operation was performed in the same conditions as Example 1 except that the random mat manufactured in Reference Example 6 was used.

Moldability was good, and a volume fraction ratio (Vf) of the reinforcing fibers of the obtained shaped product was 30%. The obtained shaped product had desired grains and good surface appearance (Good). An average fiber length (La) of the shaped product was 10 mm, a critical number of single fiber was 86, a ratio of the reinforcing fiber bundle (A) to the total amount of the reinforcing fibers was 85 Vol %, and an average number of fibers (N) in the reinforcing fiber bundle (A) was 2400. It was confirmed that there was no difference between tensile properties of test specimens cut out of the shaped product in a reference direction and a direction perpendicular to the reference direction and the test specimens had an isotropic property. An evaluation result of the shaped product is represented in Table 2.

Example 8

The random mat manufactured in Reference Example 7 was hot-pressed at a temperature of 260° C. and a pressure of 3 MPa for 7 minutes by using a press machine, manufactured by Kawasaki Hydromechanics Corporation, to which a flat mold for impregnation was set. Subsequently, the random mat was cooled down to 50° C., so that a prepreg having a resin impregnation degree of 99%, a thickness of 0.6 mm, a volume fraction ratio of the reinforcing fibers (carbon fibers) of 30%, and a fiber areal weight of the reinforcing fibers of 317 g/m² was obtained.

Thereafter, three sheets of the obtained prepreg (composite material base) were heated to 260° C. by using an IR oven manufactured by NGK KILN TECH, Corporation, and were arranged in a grain-shaped graining mold (as illustrated in FIG. 1) in which a mold temperature was set to 120° C. so as to have a charge rate of 80% and then cold-pressed a pressure of 10 MPa for 60 seconds.

Moldability was good, and a volume fraction of reinforcing fibers (Vf) of the obtained shaped product was 30%. The obtained shaped product had desired grains and good surface appearance (Good). According to a result of measuring an average fiber length (La), a ratio of the reinforcing fiber bundle (A) of the shaped product and an average number of fibers (N), the average fiber length (La) was 20 mm, a critical number of single fiber was 86, a ratio of the reinforcing fiber bundle (A) to the total amount of the reinforcing fibers was 35 Vol %, and an average number of fibers (N) in the reinforcing fiber bundle (A) was 240. It was confirmed that there was no difference between tensile properties of test specimens cut out of the shaped product in a reference direction and a direction perpendicular to the reference direction and the test specimens had an isotropic property. An evaluation result of the shaped product is represented in Table 3.

Example 9

An operation was performed in the same conditions as Example 8 except that the random mat manufactured in Reference Example 8 was used, a press pressure at the time of impregnation was 5 MPa, and a press pressure at time of molding was 20 MPa.

Moldability was good, and a volume fraction ratio (Vf) of the reinforcing fibers of the obtained shaped product was 45%. The obtained shaped product had desired grains and good surface appearance (Good). An average fiber length (La) of the shaped product was 20 mm, a critical number of single fiber was 86, a ratio of the reinforcing fiber bundle (A) to the total amount of the reinforcing fibers was 35 Vol %, and an average number of fibers (N) in the reinforcing fiber bundle (A) was 240. It was confirmed that there was no difference between tensile properties of test specimens cut out of the shaped product in a reference direction and a direction perpendicular to the reference direction and the test specimens had an isotropic property. An evaluation result of the shaped product is represented in Table 3.

Example 10

The random mat manufactured in Reference Example 9 was hot-pressed at a temperature of 260° C. and a pressure of 3 MPa for 7 minutes by using a press machine, manufactured by Kawasaki Hydromechanics Corporation, to which a flat mold for impregnation was set. Subsequently, the random mat was cooled down to 50° C., so that a prepreg having a resin impregnation degree of 99%, a thickness of 0.6 mm, a volume fraction ratio of the reinforcing fibers (carbon fibers) of 30%, and a fiber areal weight of the reinforcing fibers of 317 g/m² was obtained.

Thereafter, three sheets of the obtained prepreg (composite material base) were heated to 260° C. by using an IR oven manufactured by NGK KILN TECH, Corporation, and were arranged in a grain-shaped graining mold as illustrated in FIG. 1 in which a mold temperature was set to 120° C. so as to have a charge rate of 80% and then cold-pressed a pressure of 10 MPa for 60 seconds.

Moldability was good, and a volume fraction of reinforcing fibers (Vf) of the obtained shaped product was 30%. The obtained shaped product had desired grains and good surface appearance (Good). According to a result of measuring an average fiber length (La), a ratio of the reinforcing fiber bundle (A) of the shaped product, and an average number of fibers (N), the average fiber length (La) was 10 mm, a critical number of single fiber was 86, a ratio of the reinforcing fiber bundle (A) to the total amount of the reinforcing fibers in the random mat was 35 Vol %, and an average number of fibers (N) in the reinforcing fiber bundle (A) was 240. It was confirmed that there was no difference between tensile properties of test specimens cut out of the shaped product in a reference direction and a direction perpendicular to the reference direction and the test specimens had an isotropic property. An evaluation result of the shaped product is represented in Table 3.

Comparative Example 2

An operation was performed in the same conditions as Example 1 except that the random mat manufactured in Reference Example 10 was used.

The obtained shaped product was non-uniform in thickness and had many defects. Further, the shaped product did not have desired grains and a bad surface appearance (No Good). An evaluation result of the shaped product is represented in Table 3. It was clear that the shaped product of the present Comparative Example 2 had low quality, tensile strength and tensile modulus were not measured.

Comparative Example 3

An operation was performed in the same conditions as Example 1 except that the random mat manufactured in Reference Example 11 was used.

Moldability was good, and a volume fraction ratio (Vf) of the reinforcing fibers of the obtained shaped product was 30%. The obtained shaped product had desired grains and a good surface appearance (O). However, it was confirmed that there was a difference of about 40% between tensile properties of test specimens cut out of the shaped product in a reference direction and a direction perpendicular to the reference direction, and isotropic properties of the specimens are not good. An evaluation result of the shaped product is represented in Table 3.

Comparative Example 4

A plate-shaped prepreg was obtained by performing an operation in the same conditions as Example 1 except that the random mat manufactured in Reference Example 12 was used. The obtained prepreg was non-uniform in thickness in a range of 0.5 to 1.2 mm. It was clear that even when a molding process was carried by using this prepreg, a shaped product having a high quality could not be obtained.

Comparative Example 5

A plate-shaped prepreg was obtained by performing an operation in the same conditions as Example 1 except that the random mat manufactured in Reference Example 13 was used. The obtained prepreg was non-uniform in thickness in a range of 23.5 to 27.8 mm. It was clear that even when a molding process was carried by using this prepreg, a shaped product having a high quality could not be obtained.

Comparative Example 6

A plate-shaped prepreg was obtained by performing an operation in the same conditions as Example 1 except that the random mat manufactured in Reference Example 14 was used. The obtained prepreg had a uneven distribution of the carbon fibers and was non-uniform in thickness. It was clear that even when a molding process was carried by using this prepreg, a shaped product having a high quality could not be obtained.

Since the fiber-reinforced composite material is allowed to easily flow at the time of molding, the shaped products of Examples 1 to 10 had good moldability and a good surface appearance.

TABLE 1

|  |  | Ex. 1 | Ex. 2 | Ex. 3 | C. Ex. 1 |
|---|---|---|---|---|---|
| Base material | Reference Example | 1 | 2 | 3 | 4 |
|  | Reinforcing fiber | CF[1] | CF[1] | GF[2] | CF[1] |
|  | Thermoplastic resin | PA66[3] | PP[4] | PC[5] | PA66[3] |
|  | Layered number | 3 | 1 | 3 | 3 |

TABLE 1-continued

|  |  |  | Ex. 1 | Ex. 2 | Ex. 3 | C. Ex. 1 |
|---|---|---|---|---|---|---|
| Shaped article | Vf (%) |  | 30 | 20 | 20 | 30 |
|  | Thickness (mm) |  | 1.5 | 3.0 | 1.5 | 1.5 |
|  | Surface appearance | Grain | Fine | Fine | Coarse | — |
|  |  | State | Good | Good | Good | No Good |
|  | Tensile strength (MPa) | 0-degree direction | 275 | 115 | 180 | 264 |
|  |  | 90-degree direction | 283 | 110 | 185 | 251 |
|  | Tensile modulus (GPa) | 0-degree direction | 24 | 18 | 20 | 24 |
|  |  | 90-degree direction | 25 | 18 | 20 | 23 |
|  | Tensile modulus ratio (Eδ) |  | 1.05 | 1.03 | 1.03 | 1.07 |

[1] CF: Carbon fiber,
[2] GF: Glass fiber,
[3] PA 66: Polyamide 66,
[4] PP: Polypropylene,
[5] PC: Polycarbonate,
[6] A case where a surface appearance is good (Good), a case where desired grains are not formed due to many defects and a surface appearance is not good (No Good).

TABLE 2

|  |  |  | Ex. 4 | Ex. 5 | Ex. 6 | Ex. 7 |
|---|---|---|---|---|---|---|
| Base material | Reference Example |  | 1 | 1 | 5 | 6 |
|  | Reinforcing fiber |  | CF[1] | CF[1] | CF[1] | CF[1] |
|  | Thermoplastic resin |  | PA66[3] | PA66[3] | PA66[3] | PA66[3] |
|  | Layered number |  | 5 | 5 | 3 | 3 |
| Shaped article | Vf (%) |  | 30 | 30 | 30 | 30 |
|  | Thickness (mm) |  | 1.5 | 1.5 | 1.5 | 1.5 |
|  | Surface appearance | Grain | Leather-like | Leather-like | Fine | Fine |
|  |  | State | Good | Good | Good | Good |
|  | Tensile strength (MPa) | 0-degree direction | 264 | 279 | 276 | 260 |
|  |  | 90-degree direction | 255 | 270 | 280 | 251 |
|  | Tensile modulus (GPa) | 0-degree direction | 24 | 25 | 25 | 24 |
|  |  | 90-degree direction | 24 | 25 | 25 | 23 |
|  | Tensile modulus ratio (Eδ) |  | 1.03 | 1.02 | 1.02 | 1.07 |

[1] CF: Carbon fiber,
[3] PA 66: Polyamide 66,
[6] A case where a surface appearance is good (Good), a case where desired grains are not formed due to many defects and a surface appearance is not good (No Good).

TABLE 3

|  |  |  | Ex. 8 | Ex. 9 | Ex. 10 | C. Ex. 2 | C. Ex. 3 |
|---|---|---|---|---|---|---|---|
| Base material | Reference Example |  | 7 | 8 | 9 | 10 | 11 |
|  | Reinforcing fiber |  | CF[1] | CF[1] | CF[1] | CF[1] | CF[1] |
|  | Thermoplastic resin |  | PA6[7] | PA6[7] | PBT[8] | PA66[3] | PA66[3] |
|  | Layered number |  | 3 | 3 | 3 | 3 | 3 |
| Shaped article | Vf (%) |  | 30 | 45 | 30 | — | 30 |
|  | Thickness (mm) |  | 1.5 | 1.5 | 1.5 | 1.4-2.0 | 1.5 |
|  | Surface appearance | Grain | Fine | Fine | Fine | — | Fine |
|  |  | State | Good | Good | Good | No good | Good |
|  | Tensile strength (MPa) | 0-degree direction | 252 | 451 | 255 | — | 244 |
|  |  | 90-degree direction | 249 | 440 | 255 | — | 202 |
|  | Tensile modulus (GPa) | 0-degree direction | 24 | 35 | 25 | — | 24 |
|  |  | 90-degree direction | 24 | 34 | 24 | — | 18 |
|  | Tensile modulus ratio (Eδ) |  | 1.03 | 1.03 | 1.05 | — | 1.37 |

[1] CF: Carbon fiber,
[3] PA 66: Polyamide 66,
[7] PA 6: Polyamide 6,
[8] PBT: Polybutyleneterephtalate
[6] A case where a surface appearance is good (Good), a case where desired grains are not formed due to many defects and a surface appearance is not good (No Good).

INDUSTRIAL APPLICABILITY

A shaped product of the present invention can be appropriately used in various fields such as electrical and electronic equipments, automobiles, medical equipments, aircrafts, building materials, and general industrial parts.

Although the present invention has been described with reference to detailed and specific examples, it is clear to one of ordinary skill in the art that various changes or modifications may be made without departing from the spirit and scope of the present invention.

The present application claims priority to and the benefit of Japanese Patent Application No. 2011-193977, filed on Sep. 6, 2011, the disclosures of which are incorporated herein by reference.

What is claimed is:

1. A shaped product comprising:
   a fiber-reinforced composite material including reinforcing fibers with an average length of 5 mm or more and 100 mm or less and a thermoplastic resin,
   wherein the reinforcing fibers are at least one selected from the group consisting of carbon fibers, glass fibers, and aramid fibers,
   a volume fraction of the reinforcing fibers (Vf=100× volume of the reinforcing fibers/(volume of the reinforcing fibers+volume of the thermoplastic resin)) is 5 to 80%,
   grains are formed on a surface of the shaped product, the fiber-reinforced composite material includes a reinforcing fiber bundle (A) including the reinforcing fibers of a critical number of single fiber or more, and a reinforcing fiber bundle including the reinforcing fibers of less than the critical number of single fiber, the critical number being defined by Formula (1), and
   a ratio of the reinforcing fiber bundle (A) to a total amount of the reinforcing fibers is 20 Vol % or more and 99 Vol % or less:

$$\text{Critical number of single fiber}=600/D \tag{1}$$

wherein D is an average fiber diameter (μm) of single reinforcing fiber.

2. The shaped product of claim 1,
   wherein an average number of fibers (N) of the reinforcing fiber bundle (A) satisfies Formula (2):

$$0.7\times10^4/D^2<N<1\times10^5/D^2 \tag{2}$$

wherein D is an average fiber diameter (μm) of single reinforcing fiber.

3. The shaped product of claim 1,
   wherein a ratio (Eδ) obtained by dividing a higher value by a lower value of tensile modulus values measured in an arbitrary direction and a direction perpendicular to the arbitrary direction is 1.0 to 1.3.

4. The shaped product of claim 1,
   wherein the grains on the surface of the shaped product are regular concave and convex patterns or regular wrinkles.

5. The shaped product of claim 1,
   wherein the reinforcing fibers are carbon fibers.

6. The shaped product of claim 1,
   wherein the thermoplastic resin is at least one selected from the group consisting of polyolefin, polyamide, polycarbonate, and polyester.

7. A method for manufacturing the shaped product of claim 1 by using a random mat including reinforcing fibers with an average fiber length of 5 mm or more and 100 mm or less and a thermoplastic resin, wherein a fiber areal weight of the reinforcing fibers is 25 to 10000 g/m², the random mat includes a reinforcing fiber bundle (A) including the reinforcing fibers of a critical number of single fiber or more, and a reinforcing fiber bundle including the reinforcing fibers of less than the critical number of single fiber, the critical number being defined by Formula (1), and a ratio of the reinforcing fiber bundle (A) to a total amount of the reinforcing fibers in the random mat is 20 Vol % or more and 99 Vol % or less:

$$\text{Critical number of single fiber}=600/D \tag{1}$$

wherein D is an average fiber diameter (μm) of single reinforcing fiber,
   the method comprising steps A-1) to A-3) for performing an impregnation process and a molding process:

A-1) obtaining a prepreg by heating and pressurizing the random mat to a temperature in a range of a melting point of the thermoplastic resin to a decomposition temperature of the thermoplastic resin when the thermoplastic resin is crystalline or to a temperature in a range of a glass transition temperature of the thermoplastic resin to a decomposition temperature of the thermoplastic resin when the thermoplastic resin is amorphous to impregnate the thermoplastic resin into the reinforcing fibers;

A-2) arranging the prepreg obtained in A-1) in a graining mold whose temperature is adjusted to a temperature lower than the melting point of the thermoplastic resin when the thermoplastic resin is crystalline or to a temperature lower than the glass transition temperature of the thermoplastic resin when the thermoplastic resin is amorphous to have a charge rate expressed by Formula (3) in a range of 5% or more, after the prepreg obtained in A-1) is heated to a temperature equal to or higher than the melting point of the thermoplastic resin and lower than the decomposition temperature of the thermoplastic resin when the thermoplastic resin is crystalline or to a temperature equal to or higher than the glass transition temperature of the thermoplastic resin and lower than the decomposition temperature of the thermoplastic resin when the thermoplastic resin is amorphous:

$$\text{Charge rate (\%)}=100\times\text{base material area(mm}^2\text{)/projected area(mm}^2\text{) of cavity of mold} \tag{3}$$

wherein the base material area represents a projected area of all arranged random mat or prepreg in a draft direction, and
   the projected area of the cavity of the mold represents a projected area in the draft direction; and A-3) pressurizing and molding the prepreg arranged in the graining mold in A-2), or
   the method including steps B-1) to B-4) for performing an impregnation process and a molding process:

B-1) arranging the random mat in a graining mold to have a charge rate expressed by Formula (3) in a range of 5% or more:

$$\text{Charge rate (\%)}=100\times\text{base material area(mm}^2\text{)/projected area(mm}^2\text{) of cavity of mold} \tag{3}$$

wherein the base material area represents a projected area of all arranged random mat or prepreg in a draft direction, and
   the projected area of the cavity of the mold represents a projected area in the draft direction;

B-2) heating the graining mold to a temperature in a range of a melting point of the thermoplastic resin to a decomposition temperature of the thermoplastic resin when the thermoplastic resin is crystalline or to a temperature in a range of a glass transition temperature of the thermoplastic resin to a decomposition temperature of the thermoplastic resin when the thermoplastic resin is amorphous, and pressuring the random mat to perform impregnation (first press step);

B-3) pressurizing the random mat in at least one pressure step so as to allow a pressure of a final pressure step to be 1.2 to 100 times greater than a pressure in the first press step (second press step); and B-4) molding the random mat by adjusting a temperature of the mold to be lower than the melting point of the thermoplastic resin when the thermoplastic resin is crystalline or to be lower than the glass transition temperature of the thermoplastic resin when the thermoplastic resin is amorphous.

8. The method for manufacturing the shaped product of claim 7,
wherein an average number of fibers (N) of the reinforcing fiber bundle (A) satisfies Formula (2):

$$0.7 \times 10^4/D^2 < N < 1 \times 10^5/D^2 \qquad (2)$$

wherein D is an average fiber diameter (μm) of single reinforcing fiber.

9. The method for manufacturing the shaped product of claim 7,
wherein the prepreg in A-2) or the random mat in B-1) is arranged at a horizontal part (0 degrees) of the graining mold or at an inclined part of the graining mold, having an angle of 70 degrees or less with respect to the horizontal part.

10. The method for manufacturing the shaped product of claim 7,
wherein when the prepreg or the random mat as a base material is arranged in the graining mold, the base material is arranged to avoid branched portions of the shaped product to be obtained.

11. The method for manufacturing the shaped product of claim 7,
wherein the charge rate represented by Formula (3) is 5% to 100%.

12. The method for manufacturing the shaped product of claim 7,
wherein the charge rate represented by Formula (3) is 50% to 90%.

13. The method for manufacturing the shaped product of claim 7,
wherein the random mat has a volume fraction of reinforcing fibers (Vf=100×volume of the reinforcing fibers/(volume of the reinforcing fibers+volume of the thermoplastic resin)) in a range of 5 to 80%.

14. The method for manufacturing the shaped product of claim 7,
wherein an amount of the thermoplastic resin in the random mat is 50 to 1000 parts by weight based on 100 parts by weight of the reinforcing fibers.

15. The shaped product of claim 1, wherein the reinforcing fibers are opened.

16. The shaped product of claim 1, where the grains have a draft angle of 0.1 to 50 degrees.

17. The method for manufacturing the shaped product of claim 7, wherein the reinforcing fibers are opened.

18. The method for manufacturing the shaped product of claim 7, where the grains have a draft angle of 0.1 to 50 degrees.

* * * * *